(12) United States Patent
Wilder

(10) Patent No.: US 8,955,699 B2
(45) Date of Patent: Feb. 17, 2015

(54) ROTATING ORGANIZER USING JARS OR OTHER CONTAINERS FOR STORAGE

(76) Inventor: Bruce Gary Wilder, Frisco, TX (US)

( * ) Notice: Subject to any disclaimer, the term of this patent is extended or adjusted under 35 U.S.C. 154(b) by 403 days.

(21) Appl. No.: 13/447,184

(22) Filed: Apr. 14, 2012

(65) Prior Publication Data

US 2012/0201644 A1    Aug. 9, 2012

Related U.S. Application Data

(63) Continuation-in-part of application No. 12/564,916, filed on Sep. 22, 2009, now abandoned.

(51) Int. Cl.
| A47B 73/00 | (2006.01) |
| A47B 49/00 | (2006.01) |
| A47F 5/00  | (2006.01) |
| A47J 47/16 | (2006.01) |
| B25H 3/02  | (2006.01) |

(52) U.S. Cl.
CPC ............ *A47B 49/002* (2013.01); *A47F 5/0037* (2013.01); *A47J 47/16* (2013.01); *B25H 3/025* (2013.01)
USPC .............................................. 211/77; 211/78

(58) Field of Classification Search
CPC .............. A47J 47/16; A47F 5/02; A47F 5/03; A47F 5/025; A47F 5/0037; A47F 5/05; A47F 7/283; A47B 49/002; A47B 49/00; B25H 3/02
USPC ............ 211/77, 78, 76, 163, 1.52, 53, 56, 95, 211/75, 84, 70, 85.18, 58, 164; D7/600.2, D7/600.3; 108/94; 312/266, 267, 97.1, 312/305; 248/200.1, 644
See application file for complete search history.

(56) References Cited

U.S. PATENT DOCUMENTS

| 1,732,298 | A | 2/1925  | Arthur     |
| 1,732,131 | A | 10/1929 | Mahaffey   |
| 1,927,283 | A | 10/1931 | Hernandez  |
| 2,436,289 | A | 3/1946  | Carlson    |
| 2,557,801 | A | 6/1951  | Shapiro    |
| 2,936,901 | A | 5/1960  | Siemantel  |
| 2,944,761 | A | 7/1960  | Best       |
| 3,337,082 | A | 8/1967  | Dorgelys   |
| 3,620,363 | A | 11/1971 | Donnithorne|
| 3,674,155 | A | 7/1972  | Kessler    |
| 3,805,965 | A | 4/1974  | Champagne  |

(Continued)

FOREIGN PATENT DOCUMENTS

FR    2 676 341 A1    11/1992

*Primary Examiner* — Patrick Hawn
(74) *Attorney, Agent, or Firm* — Swift & Swift; Stephen Christopher Swift

(57) ABSTRACT

An organizer that may be mounted on either one or two surfaces, such as a wall, ceiling or floor, or two of them, using limited space, and using jars or other containers for storage. It has four wooden slats that have jars or other containers attached. In the first preferred embodiment, there are several jars, the number depending on the jar size, attached to each slat. The lids are fastened to the slats, and the jars can be opened by unscrewing them from their lids. In the second preferred embodiment, plastic containers, with lids that can snap open and shut, are attached to the slates. There are handles on one end to rotate the storage system. Because they are transparent, the jars or plastic containers allow you to visually select what you are looking for. These jars or plastic containers can hold anything from hobby supplies to nuts and bolts.

12 Claims, 26 Drawing Sheets

(56) References Cited

U.S. PATENT DOCUMENTS

| | | | | |
|---|---|---|---|---|
| 3,921,948 A | * | 11/1975 | Long | 248/220.41 |
| D264,604 S | | 5/1982 | Sussman | |
| D278,585 S | | 4/1985 | Oldham | |
| 4,534,530 A | * | 8/1985 | Danko | 248/239 |
| 4,548,327 A | * | 10/1985 | Kilkelly | 211/187 |
| 4,601,628 A | | 7/1986 | Lowing | |
| 4,735,325 A | * | 4/1988 | Remmers | 211/187 |
| 4,852,748 A | | 8/1989 | Burgess et al. | |
| 4,895,260 A | | 1/1990 | Ancona et al. | |
| D320,141 S | | 9/1991 | Farrell | |
| 5,069,361 A | | 12/1991 | Jeffway, Jr. et al. | |
| 5,083,670 A | | 1/1992 | Zimmer | |
| D329,573 S | | 9/1992 | Picard | |
| 5,228,582 A | * | 7/1993 | Marshall et al. | 211/163 |
| 5,248,049 A | | 9/1993 | Murphy, Sr. | |
| D347,769 S | | 6/1994 | Kibbe | |
| 5,368,203 A | * | 11/1994 | Friedrich et al. | 222/179.5 |
| D369,710 S | * | 5/1996 | Picard et al. | D6/559 |
| 6,029,828 A | | 2/2000 | Robbins et al. | |
| 6,056,132 A | | 5/2000 | Becker et al. | |
| 6,234,326 B1 | | 5/2001 | Higgins et al. | |
| D488,643 S | | 4/2004 | Birmingham | |
| 7,207,448 B1 | | 4/2007 | Marino, Jr. | |
| D542,583 S | | 5/2007 | Watchowski et al. | |
| 7,275,647 B1 | | 10/2007 | Thompson | |
| 8,132,768 B2 | * | 3/2012 | Fernandez et al. | 248/254 |
| 8,172,095 B1 | * | 5/2012 | Herlihy | 211/70.6 |

* cited by examiner

ROTATING ORGANIZER USING JARS OR OTHER CONTAINERS FOR STORAGE

CROSS REFERENCE TO RELATED APPLICATION

This application is a Continuation-In-Part of Regular Utility patent application Ser. No. 12/564,916, filed on Sep. 22, 2009, which is incorporated herein by reference.

BACKGROUND OF THE INVENTION

1. Field of the Invention

The present invention relates to organizers for holding items.

2. Description of the Prior Art

It is desirable for an organizer or storage device to be rotatable, to permit easier selection of desired items.

U.S. Pat. No. 1,732,131, issued on Oct. 15, 1929, to Benjamin S. Mahaffey, discloses a revolving display stand using jars for storage. The instant invention is distinguishable, in that in it the rotating portion of the organizer has an axle with both of its ends attached to a mounting bracket.

U.S. Pat. No. 1,732,298, issued on Oct. 22, 1929, Charles E. Arthur, discloses a revolving spice tray, with recesses in which the tops of items may be inserted. The instant invention is distinguishable, in that in it the containers or the lids of the jars are fastened to the slats.

U.S. Pat. No. 1,927,283, issued on Sep. 19, 1933, to Robert M. Hernandez, discloses a rotating display stand using jars or other containers for storage. The instant invention is distinguishable, in that in it the jars or other containers are retained on slats.

U.S. Pat. No. 2,436,289, issued on Feb. 17, 1948, to Thomas L. I. Carlson, discloses a rotating parts rack using jars for storage, having a pivot portion is the center of an axis of rotation. The instant invention is distinguishable, in that in it the axle is retained on its ends in the mounting bracket.

U.S. Pat. No. 2,557,801, issued on Jun. 19, 1951, to Joseph Shapiro, discloses an under shelf attachment for containers, which, unlike the instant invention, does not rotate.

U.S. Pat. No. 2,936,901, issued on May 17, 1960, to George D. Siemantel, discloses a rotatable storage and display assembly for parts, which is suspended from a ceiling or other surface, rather than resting on a support bracket as in the instant invention.

U.S. Pat. No. 2,944,761, issued on Jul. 12, 1960, to Bernard H. Best, discloses a rotary spool rack, which does not use jars or other containers as in the instant invention.

U.S. Pat. No. 3,337,082, issued on Aug. 22, 1967, to Henri J. Dorgelys, discloses containers that can rotate, but does not disclose that the rotating portion can be lifted out of a mounting bracket, as in the instant invention.

U.S. Pat. No. 3,620,363, issued on Nov. 16, 1971, William C. Donnithorne, discloses a rotating storage and display device, with tubes that are parallel to the axis of rotation. The instant invention is distinguishable, in that in it the jars can be unscrewed from lids attached to rotating slats, or the containers are attached to rotating slats.

U.S. Pat. No. 3,674,155, issued on Jul. 4, 1972, to Lester A. Kessler, discloses a rotating tool storage device, with trays or holders suspended from the rotating part, but without lids attached to the rotating part, from which jars can be unscrewed, as in the first embodiment of the instant invention, and without the rotating portion being manually liftable from a mounting bracket, as in the second embodiment of the instant invention.

U.S. Pat. No. 3,805,965, issued on Apr. 23, 1974, to Albert Champagne, discloses a storage unit having an upright post with several circular plates with lids attached to their undersides, from which jars can be unscrewed. The instant invention is distinguishable, in that it rotates on a horizontal rather than vertical axis, and the jars or other containers extend outward from the axis of rotation, rather than parallel to it.

U.S. Pat. No. 4,601,628, issued on Jul. 22, 1986, to Michael M. Lowing, discloses rotary storage structures, which rotate on a horizontal axis, but without jars that can be screwed off from lids, or other containers attached to slats, as in the instant invention.

U.S. Pat. No. 4,852,748, issued on Aug. 1, 1989, to William G. Burgess et al., discloses a ferris wheel shaped fixture holding apparatus, but does not disclose jars or other containers retained on slats as in the instant invention.

U.S. Pat. No. 4,895,260, issued on Jan. 23, 1990, to Jane Ancona and Bruce Ancona, discloses a rack for cylindrical containers, in which the containers are retained in apertures, rather than the containers or their lids being fastened to slats as in the instant invention.

U.S. Pat. No. 5,069,361, issued on Dec. 3, 1991, to Robert W. Jeffway, Jr. and Catherine R. Dobosz, discloses a rotatable crayon caddy, but does not disclose a rotatable portion retained on a mounting bracket that is separate from the rotatable portion, as in the instant invention.

U.S. Pat. No. 5,083,670, issued on Jan. 28, 1992, to John J. Zimmer, discloses a revolving storage device for small items, with end caps of containers being affixed to a rotating drum, but it does not disclose rotatable elongated attachment members, as in the instant invention.

U.S. Pat. No. 5,228,582, issued on Jul. 20, 1993, to J. C. Marshall and James C. Marshall II, discloses a rotating holder for screws, bolts, nuts and washers, but does not disclose jars or containers mounted on slats as in the instant invention.

U.S. Pat. No. 5,248,049, issued on Sep. 28, 1993, to James E. Murphy, Sr., discloses a rotating tray caddy for holding items such as nuts and bolts, but without the closed containers of the instant invention.

U.S. Pat. No. 6,029,828, issued on Feb. 29, 2000, to E. Stanley Robbins et al., discloses a turntable storage device, but does not disclose jar lids or containers mounted on multiple slats, as in the instant invention.

U.S. Pat. No. 6,056,132, issued on May 2, 2000, to Bryan Robert Becker and Sean M. Murray, discloses a magnetizable parts holder, including a revolving drum having externally-mounted magnets. The instant invention is distinguishable, in that it does not require the use of magnets, and has jar lids or containers attached to slats.

U.S. Pat. No. 6,234,326, issued on May 22, 2001, to Mark A. Higgins, James David Robertson and James Douglas Whiten, discloses a beverage display rack with head locking keyways, but does not discloses that it rotates as in the instant invention.

U.S. Pat. No. 7,207,448, issued on Apr. 24, 2007, to Frank Martino, Jr., discloses a modular storage system, with containers Attached to the undersides of shelves, but it does not rotate as does the instant invention.

U.S. Pat. No. 7,275,647, issued on Oct. 2, 2007, to Alan S. Thompson, discloses a spice rack having a rotatable carriage with tracks within which containers are retained. The instant invention is distinguishable, in that in it the containers or the lids of jars are fastened to slats.

U.S. Pat. No. Des. 264,604, issued on May 25, 1982, to Howard Sussman, discloses a design for a desk unit for paper clips and sundries, without the closed containers of the instant invention.

U.S. Pat. No. Des. 278,585, issued on Apr. 30, 1985, to Rodnie D. Oldham, discloses a design for a rotatable storage rack for spice jars and the like, but not containers that are attached to slats, as in the instant invention.

U.S. Pat. No. Des. 320,141, issued on Sep. 24, 1991, to Kenneth L. Farrell, discloses a design for a spice rack, but not an axle retained in a mounting bracket, as in the instant invention.

U.S. Pat. No. Des. 329,573, issued on Sep. 22, 1992, to Serge Picard, discloses a design for a container storage assembly, in which the lids of jars appear to be fastened to a member that may rotate, but it does not disclose that the lids or containers are retained on slats between end pieces, as in the instant invention.

U.S. Pat. No. Des. 347,769, issued on Jun. 14, 1994, to Marcus W. Kibbe, discloses a design for a combined revolving spice rack and spice grinder containers, in which the lids of the containers appear to extend outward from the rack, rather than lids or the containers being fastened to slats as in the instant invention.

U.S. Pat. No. Des. 369,710, issued on May 14, 1996, to Serge Picard and Dominique Lesquir, discloses a design for a revolving container storage assembly, but it does not disclose that the containers are retained on slats between end pieces, as in the instant invention.

U.S. patent No. D488,643, issued on Apr. 20, 2004, to Gerald Birmingham, discloses a design for a portable storage unit, with shelves that may rotate, with the shelves having holes that may retain jars, but it does not disclose lids or containers fastened to the rotating part, as in the instant invention.

U.S. patent No. D542,583, May 15, 2007, to Mark A. Watchowski and Loretta S. Watchowski, disclose rotatable elongated attachment members, as in the instant invention.

French Patent No. 2 76 341, published on Nov. 20, 1992, to Michel Paris, discloses a wine cellar with rotary hydraulic elevated storage racks. It does not discloses jar lids or containers attached to rotating slats, as in the instant invention.

None of the above inventions and patents, taken either singly or in combination, is seen to describe the instant invention as claimed.

SUMMARY OF THE INVENTION

The present invention is an organizer that may be mounted on either one or two surfaces, such as a wall, ceiling or floor, or any two of them, using limited space, and using jars or other containers for storage. It has four wooden slats that have jars or other containers attached. (Alternatively, the slats may be made from various metals, alloys, or plastics.) In the first preferred embodiment, there are several jars attached to each slat. (The number of jars attached to a slat is dependent of the size of the jars used on a particular slat.) The lids are fastened to the slats, and the jars can be opened by unscrewing them from their lids. In the second preferred embodiment, plastic containers, with lids that can snap open and shut, are attached to the slats. There are handles on one end to rotate the storage system. There may be a ratchet on the interior to prevent slipping. The optional ratchet allows rotation in only one direction; otherwise, the organizer can be rotated either clockwise or counterclockwise. Because they are transparent, the jars or plastic containers allow you to visually select what you are looking for. These jars or plastic containers can hold anything from hobby supplies to nuts and bolts. Potential applications range from garage organizing to commercial applications. It can be mounted in a commercial van for electricians or plumbers, or any other commercial vehicle. The invention may be suitably scaled for different uses. E.g., a small version may be mounted in a kitchen and used as a spice rack.

Accordingly, it is a principal object of the invention to provide an improved means for organizing various items by placing them in transparent containers.

It is another object of the invention to provide an improved means for finding a particular item from among the items organized.

It is a further object of the invention to provide an organizer for home use.

Still another object of the invention is to provide an organizer for business use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
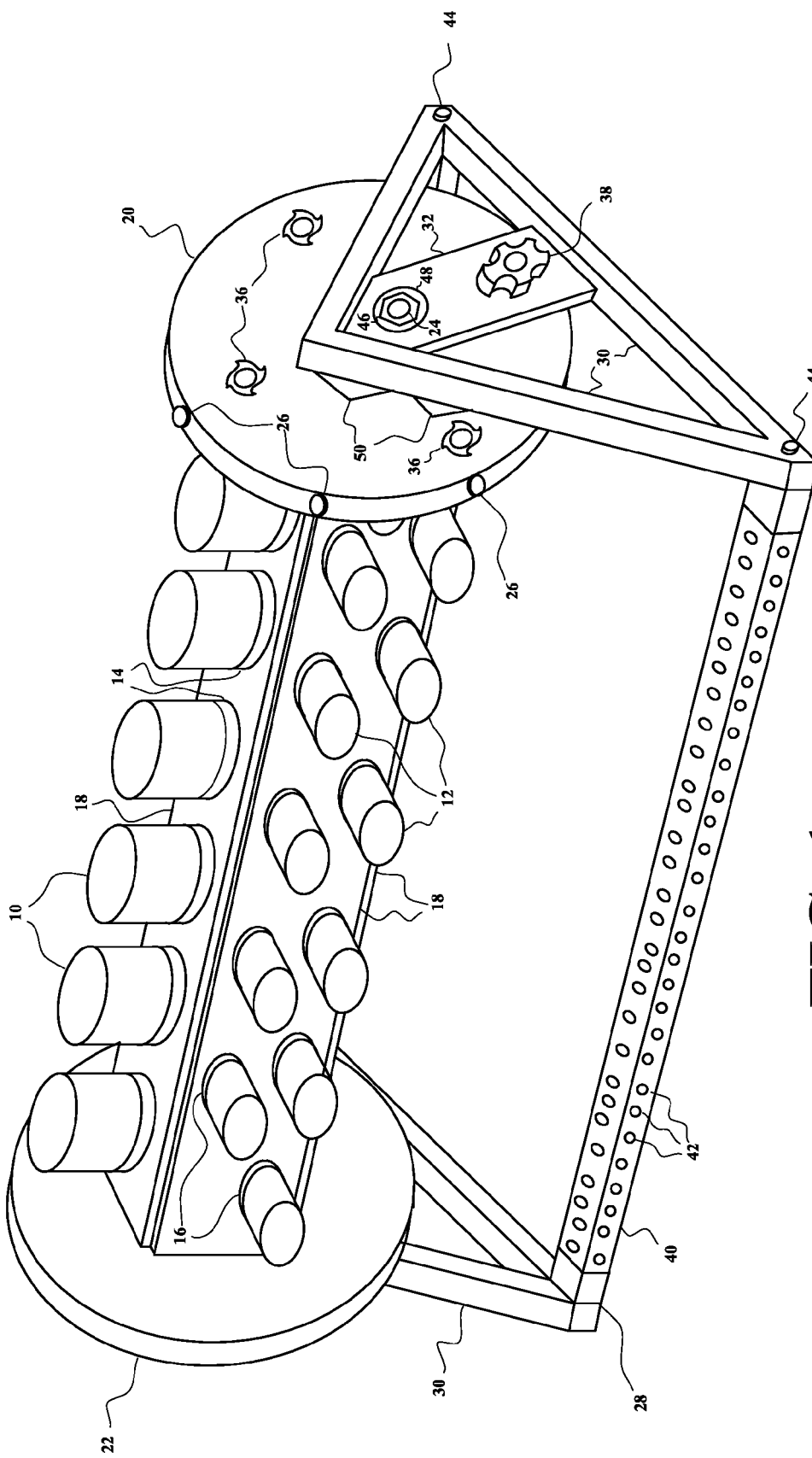
FIG. 1 is a perspective view of the first preferred embodiment of the invention.

FIG. 1 is a perspective view of the first preferred embodiment of the invention, showing large jars 10 and small jars 12. Different items may be put in different jars to organize them. Large jar lids 14 and small jar lids 16 are retained on generally rectangular slats 18 by screws, nails, glue or other suitable means. The jars are removably retained on the jar lids by external screw threads around the openings of the jars that engage internal screw threads in side walls of the jar lids. The slats are retained between generally circular end pieces 20 and 22. The slats, end members, jar lids, jars and any items in them all rotate around the axle 24. The axle is preferably a dead axle that does not itself rotate, but it may also be a live axle that rotates with the slats. Rotation of the slats about the axle is preferably permitted in either a clockwise or counterclockwise direction, but an optional ratchet (not shown) may permit rotation in one direction only. Handles 26 on the rim of the right end piece 20 facilitate manual rotation of the slats. Mounting bracket 28 has two triangular frames 30 at each end with vertical center supports 32 having holes in which the opposite ends of the axle 24 are retained. A locking member (34 in FIG. 4) passes through a second hole in the right center support 32 to engage one of the locking sockets 36 in the right end piece. A knurled knob 38 can be manually rotated to move the locking member in and out. Two attachment members 40 run between corners of the triangular frames. The attachment members have holes 42 through which nail, screws or other fasteners can pass, and can rotate 360 degrees on pivots 44 to permit attachment to one or two surfaces. The jars are preferably made of transparent glass, so that items in the jars can be viewed without opening the jars. The slats and end members are preferably made of wood, but can also be made of metal, alloy or plastic. The axle, supporting bracket and jar lids are preferably made of metal, but can also be made of alloy or plastic.

Figure 2:
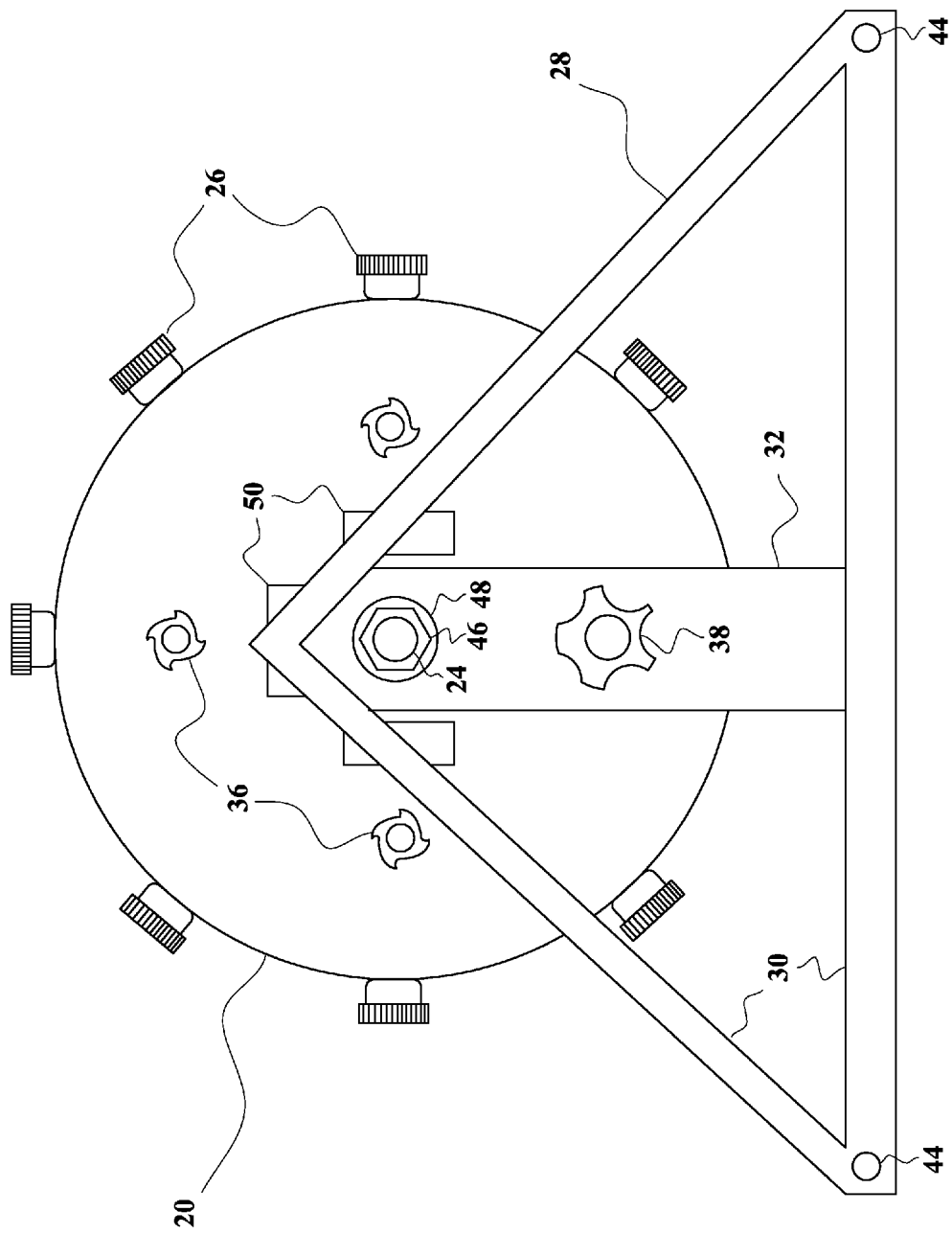
FIG. 2 is a right side elevational view of the first preferred embodiment of the invention.

FIG. 2 is a right side elevational view of the first preferred embodiment of the invention. Ends of the axles are held in place by external nuts 46 with the aid of external washers 48. Ends of the slats are retained in rectangular holes 50 in the end pieces.

Figure 3:
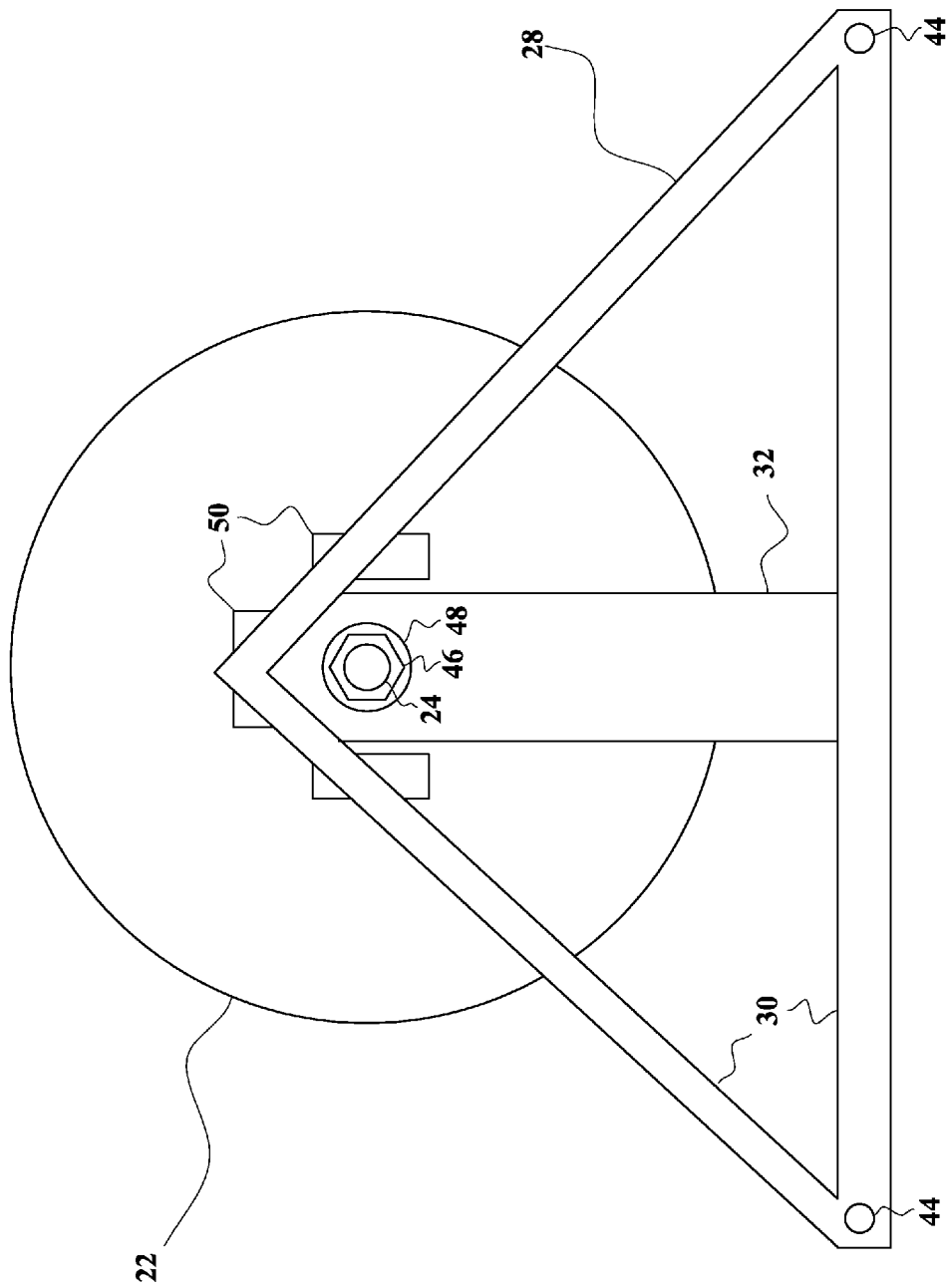
FIG. 3 is a left side elevational view of the first preferred embodiment of the invention.

FIG. 3 is a left side elevational view of the first preferred embodiment of the invention. The left end piece 22 does not have handles, locking pins or locking sockets. (Alternatively, both end pieces may have handles around their rims and/or there may be locking pins and locking sockets at both ends of the organizer.)

Figure 4:
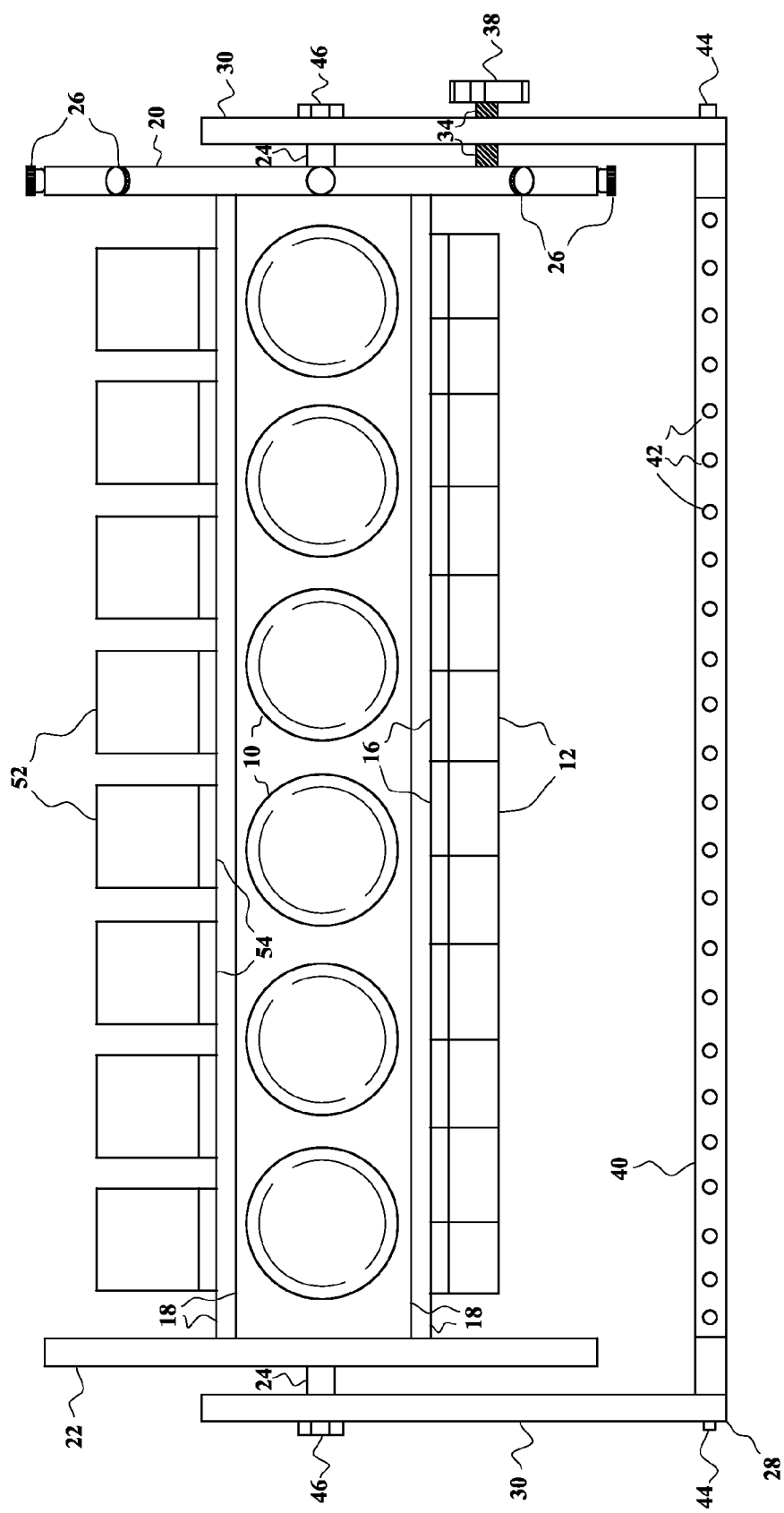
FIG. 4 is a front elevational view of the first preferred embodiment of the invention, with the large jars facing forward.

FIG. 4 is a front elevational view of the first preferred embodiment of the invention, with the large jars 10 facing forward, small jars 12 on the bottom, and medium-sized jars 52 on the top. The medium-sized jars are screwed into medium-sized jar lids 54 attached to a slat. The slats 18 are parallel to the axle 24. Each slat is an equal distance from the axle. Edges of each slat contact edges of the two slats that are closest to itself. The slats are radially symmetric with respect to the axle. The end pieces are perpendicular to the axle. The jar lids have flat circular tops that are attached to the slats, and cylindrical sides with internal screw threads that can engage external screw threads around openings of jars, and the cylindrical sides extend outward from the axle. The locking member 34 is shown in a closed position where it passes into one of the locking sockets (36 in FIG. 2) thus preventing the end member from rotating, and thereby also preventing the slats and jars from rotating. Exterior screw threads on the locking member engage interior screw threads in the second hole in the right center support. The attachment member 40 shown in FIG. 4 has been rotated to a position such that, if the other attachment member is rotated to the same position, the organizer can be fastened to a single surface.

Figure 5:
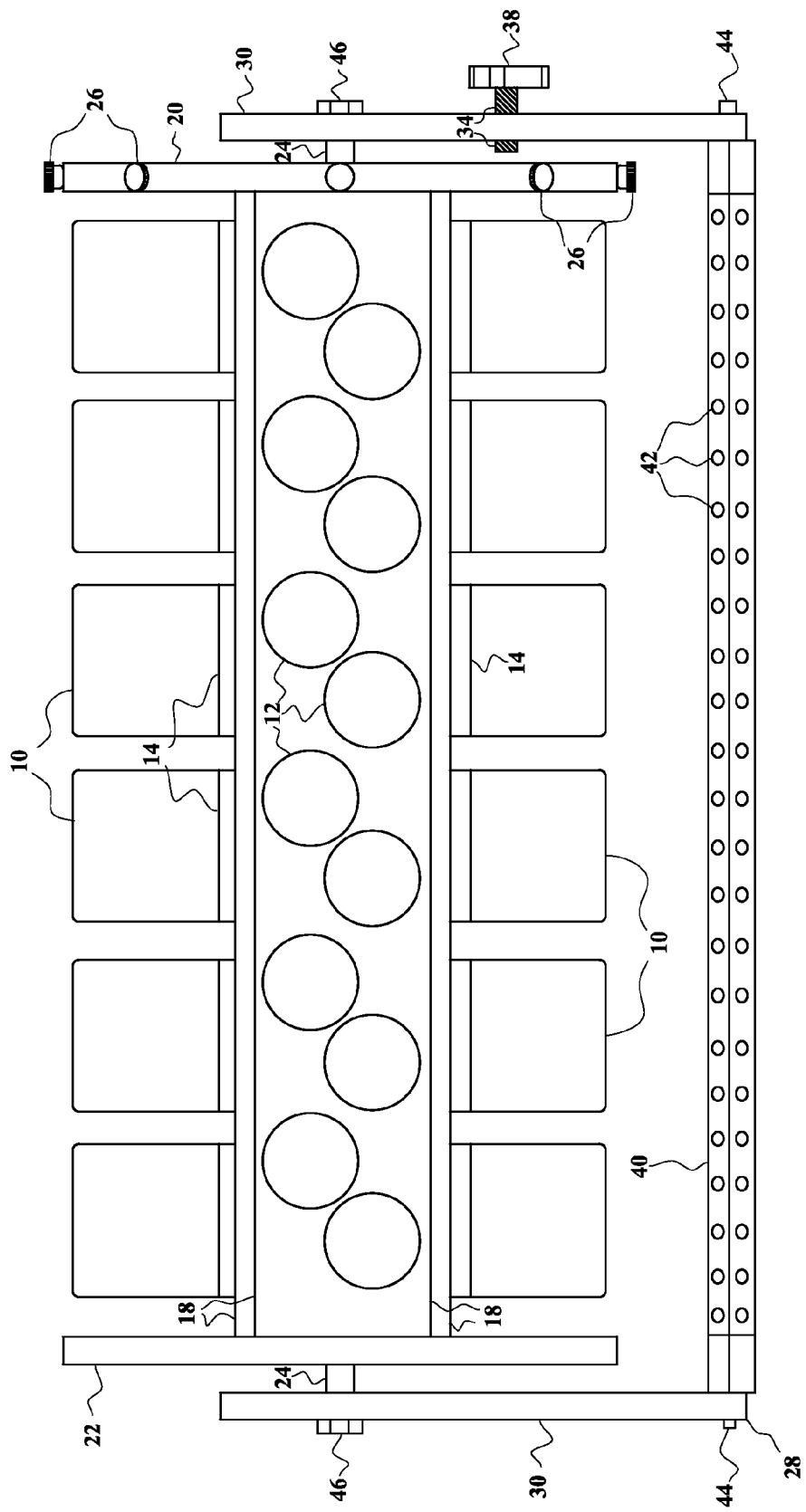
FIG. 5 is a front elevational view of the first preferred embodiment of the invention, with the small jars facing forward.

FIG. 5 is a front elevational view of the first preferred embodiment of the invention, with the small jars 12 facing forward, and large jars 10 on both the top and bottom. The locking member 34 is shown in an open position where it has been screwed back, so that it does not pass into one of the locking sockets, thus permitting rotation. The attachment member 40 shown in FIG. 5 has been rotated to a position such that, if the other attachment member is rotated to the same position, the organizer can be fastened to two perpendicular surfaces.

Figure 6:
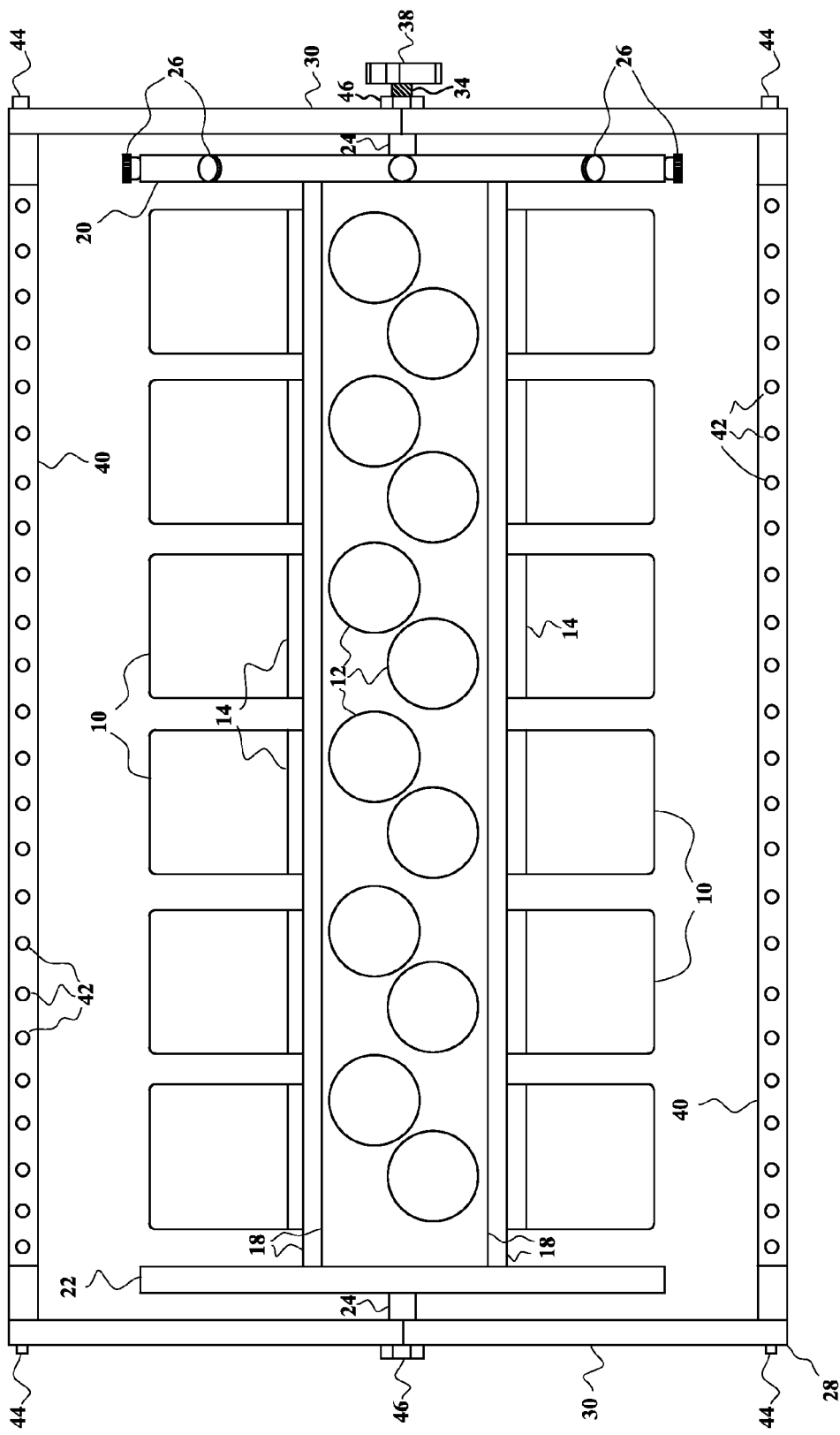
FIG. 6 is a top view of the first preferred embodiment of the invention, with the small jars on top.

FIG. 6 is a top view of the first preferred embodiment of the invention, with the small jars 12 on top, and the large jars 10 on the front and rear sides. The attachment members 40 have been rotated to a position such that the organizer can be fastened to a single surface, and the locking member 34 is in a closed position, as in FIG. 4.

Figure 7:
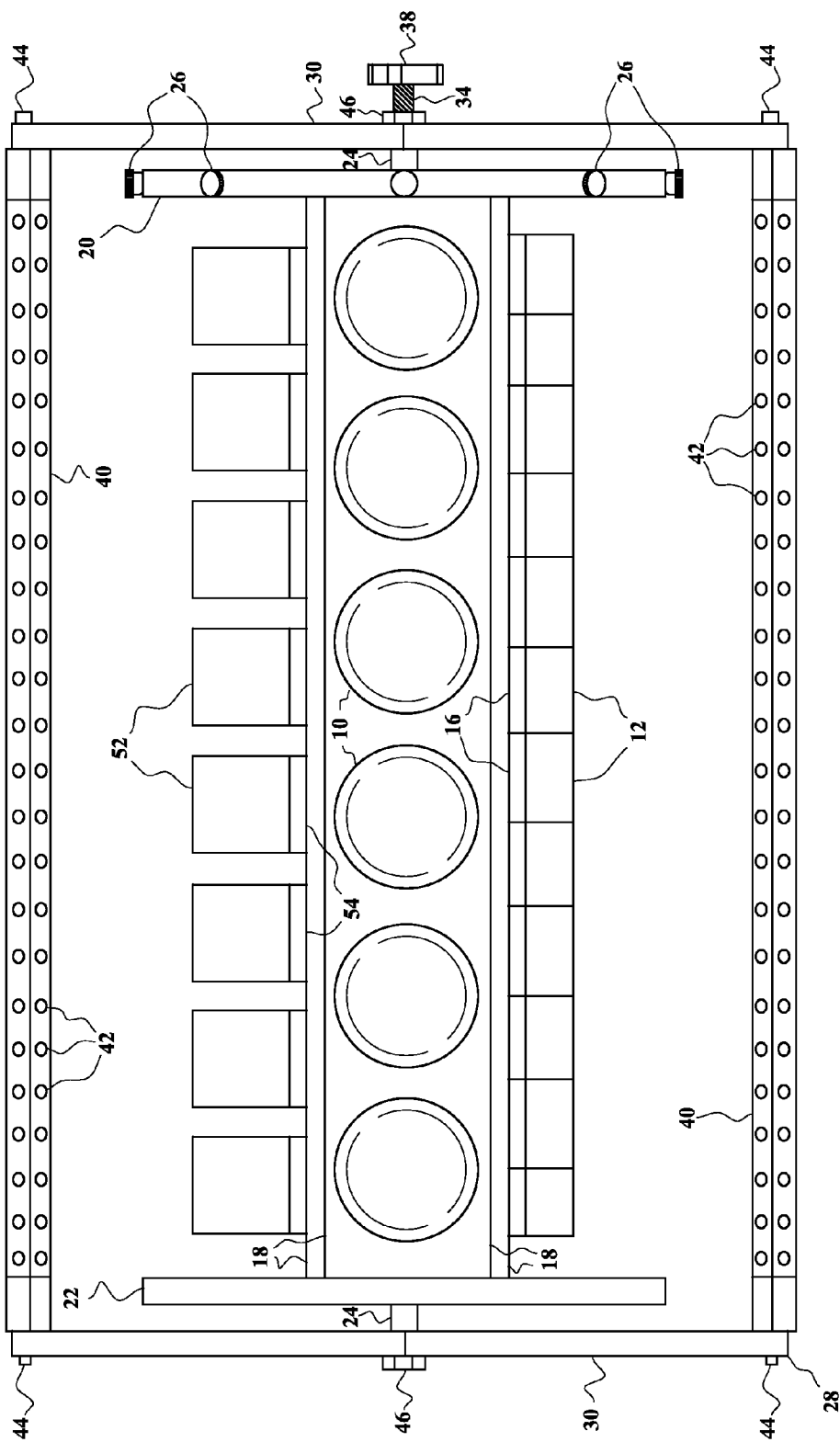
FIG. 7 is a top view of the first preferred embodiment of the invention, with the large jars on top.

FIG. 7 is a top view of the first preferred embodiment of the invention, with the large jars 10 on top, the small jars 12 on the front side, and the medium jars 52 on the rear side. The attachment members 40 have been rotated to a position such that the organizer can be fastened to two perpendicular surfaces, and the locking member 34 is in an open position, as in FIG. 5.

Figure 8:
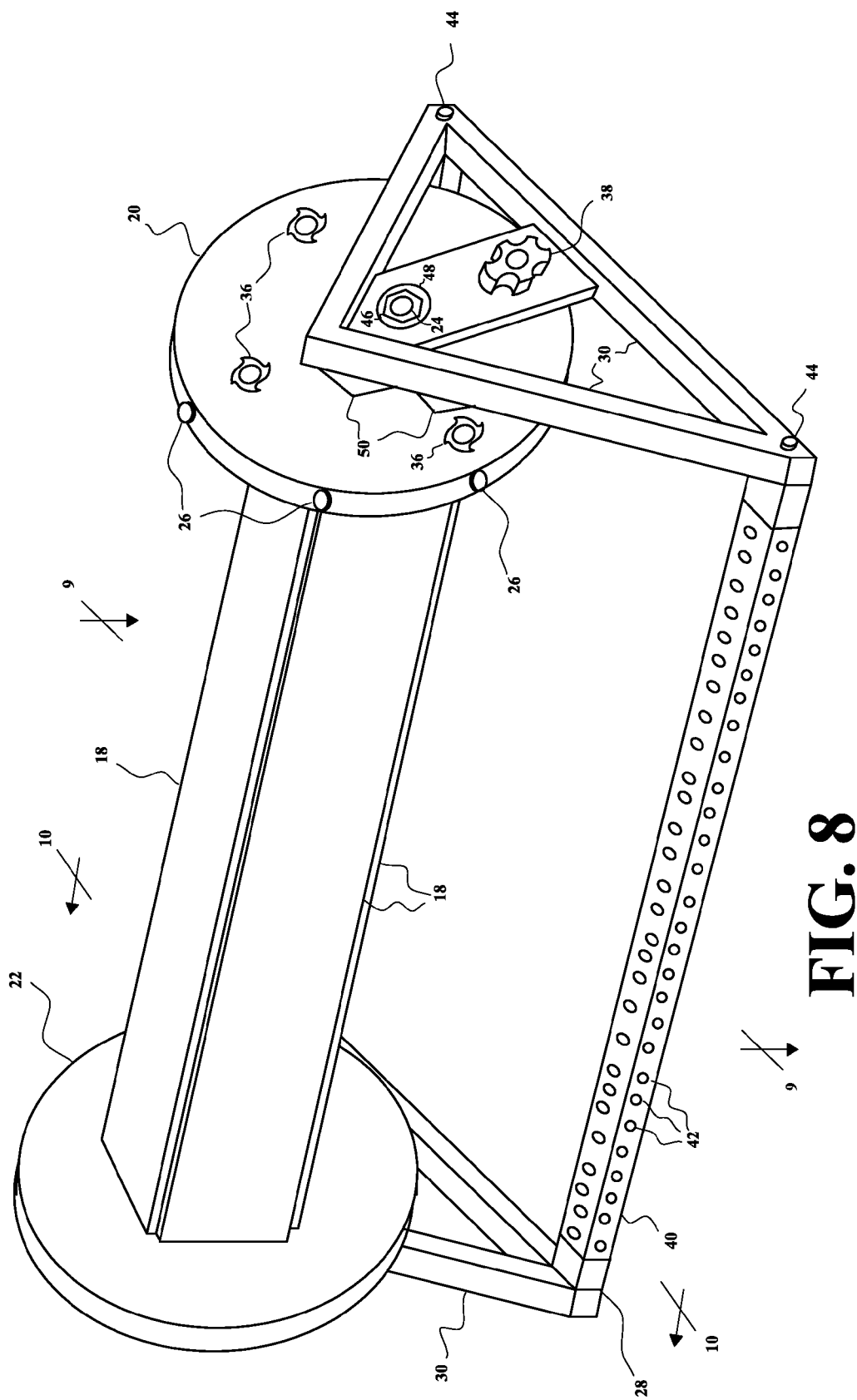
FIG. 8 is a perspective view of the first preferred embodiment of the invention, without the jars or lids.
Figure 9:
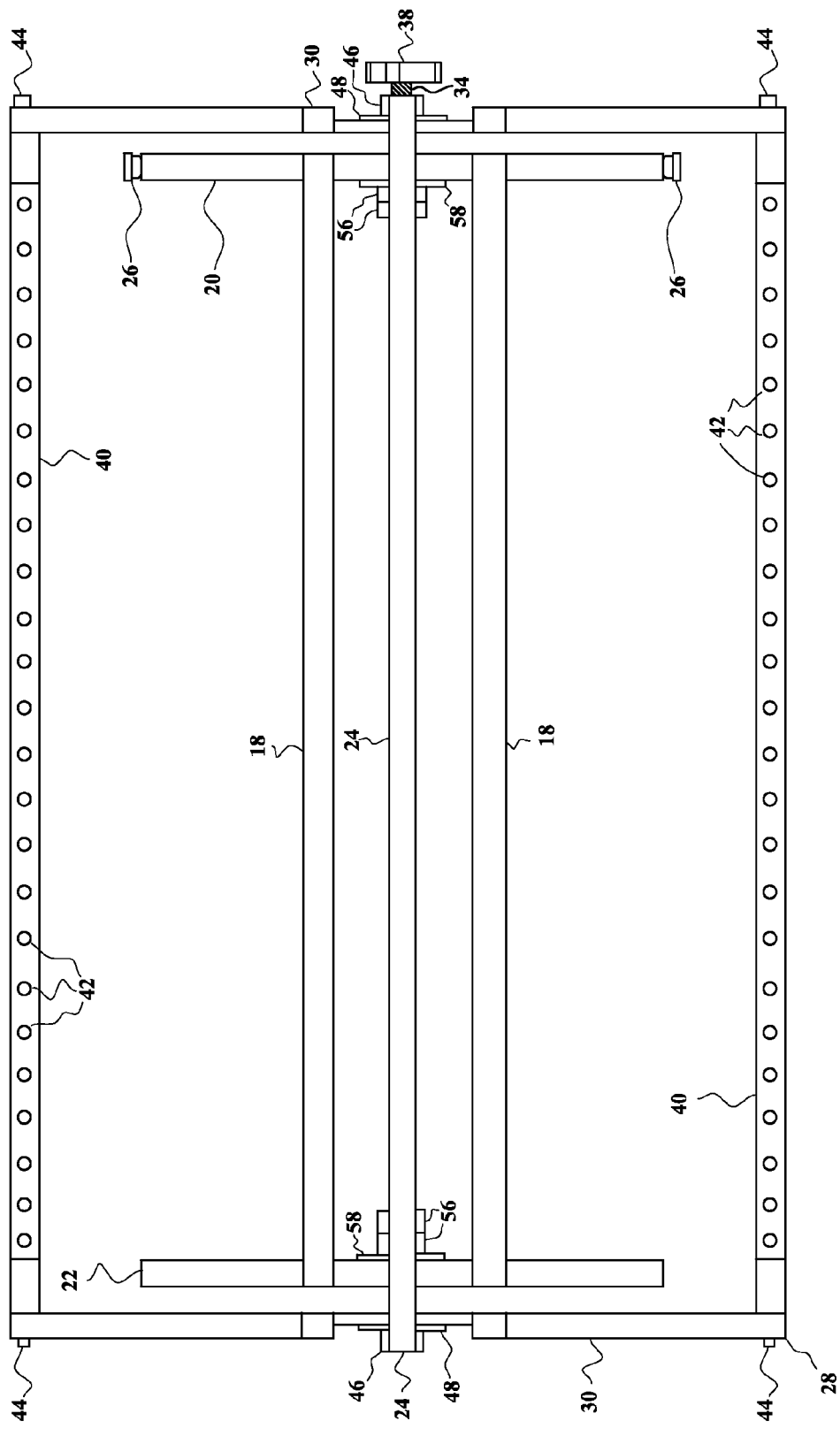
FIG. 9 is a sectional view along lines 9-9 in FIG. 8.
Figure 10:
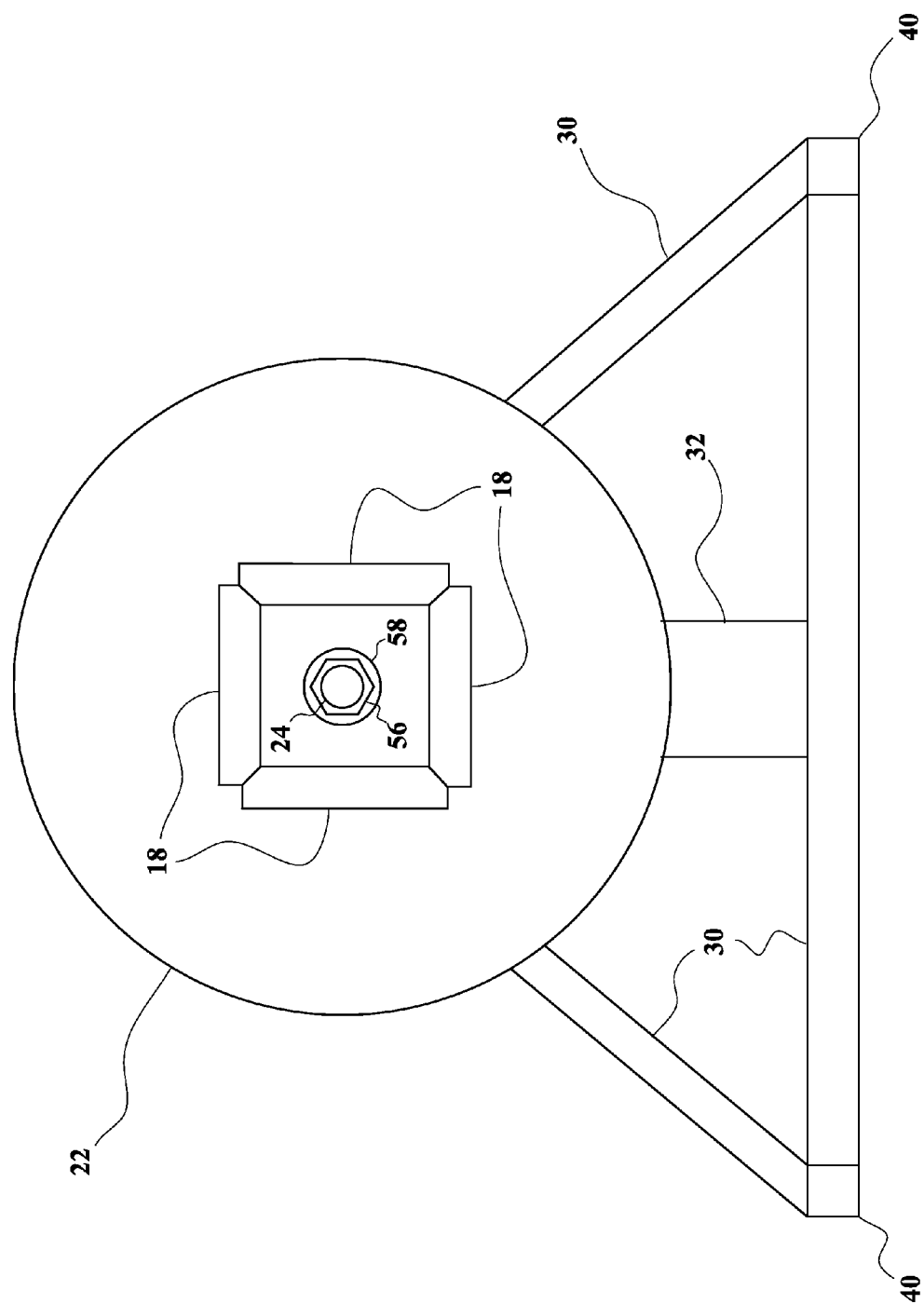
FIG. 10 is a sectional view along lines 10-10 in FIG. 8.

FIG. 8 is a perspective view of the first preferred embodiment of the invention, without jars or lids. FIG. 9 is a sectional view along lines 9-9 in FIG. 8, showing the axle 24 held in place with the aid of internal nuts 56 and internal washers 58. FIG. 10 is a sectional view along lines 10-10 in FIG. 8.

Figure 11:
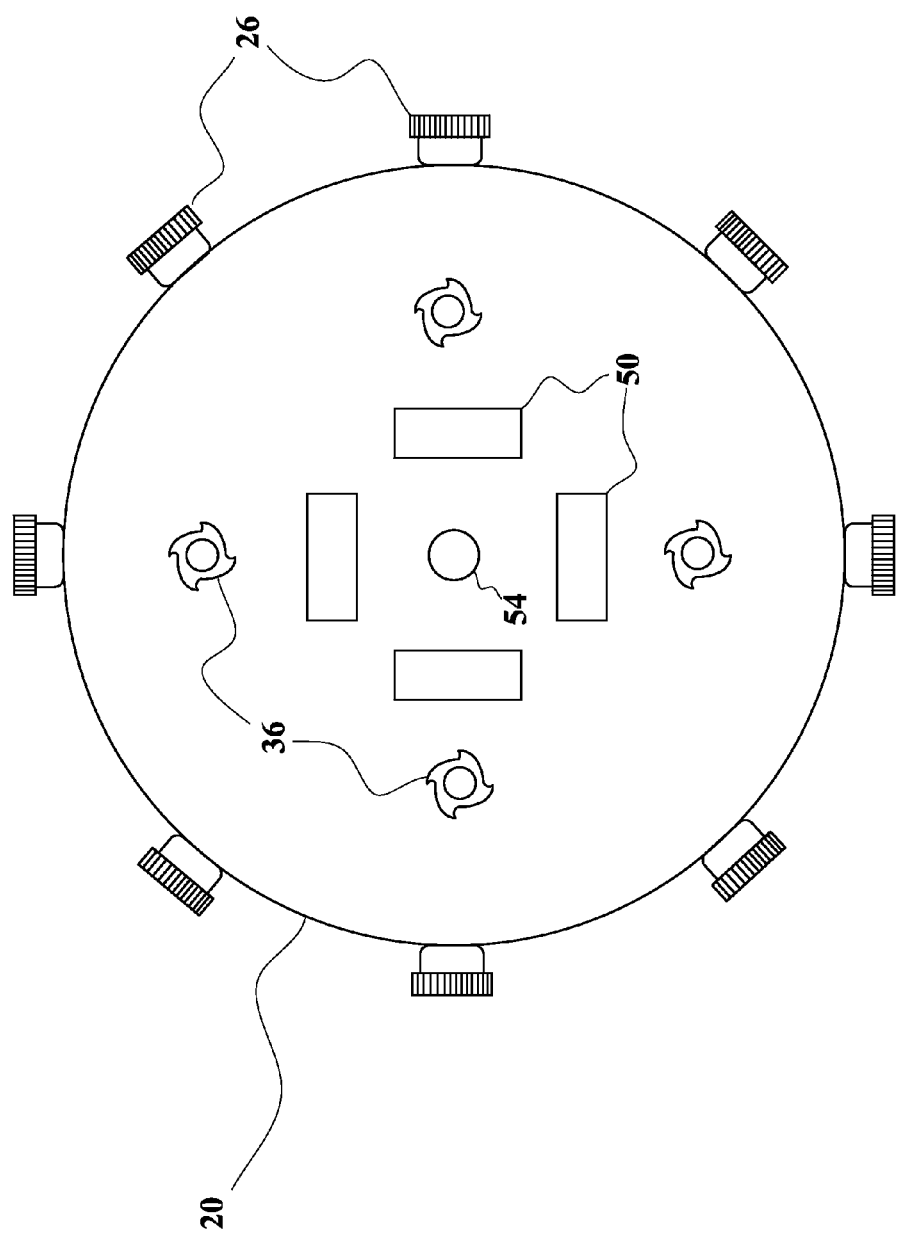
FIG. 11 is a detail view of the right side end piece of the first preferred embodiment of the invention.

FIG. 11 is a detail view of the right side end piece of the first preferred embodiment of the invention, showing the center hole 54 through which the axle passes.

Figure 12:
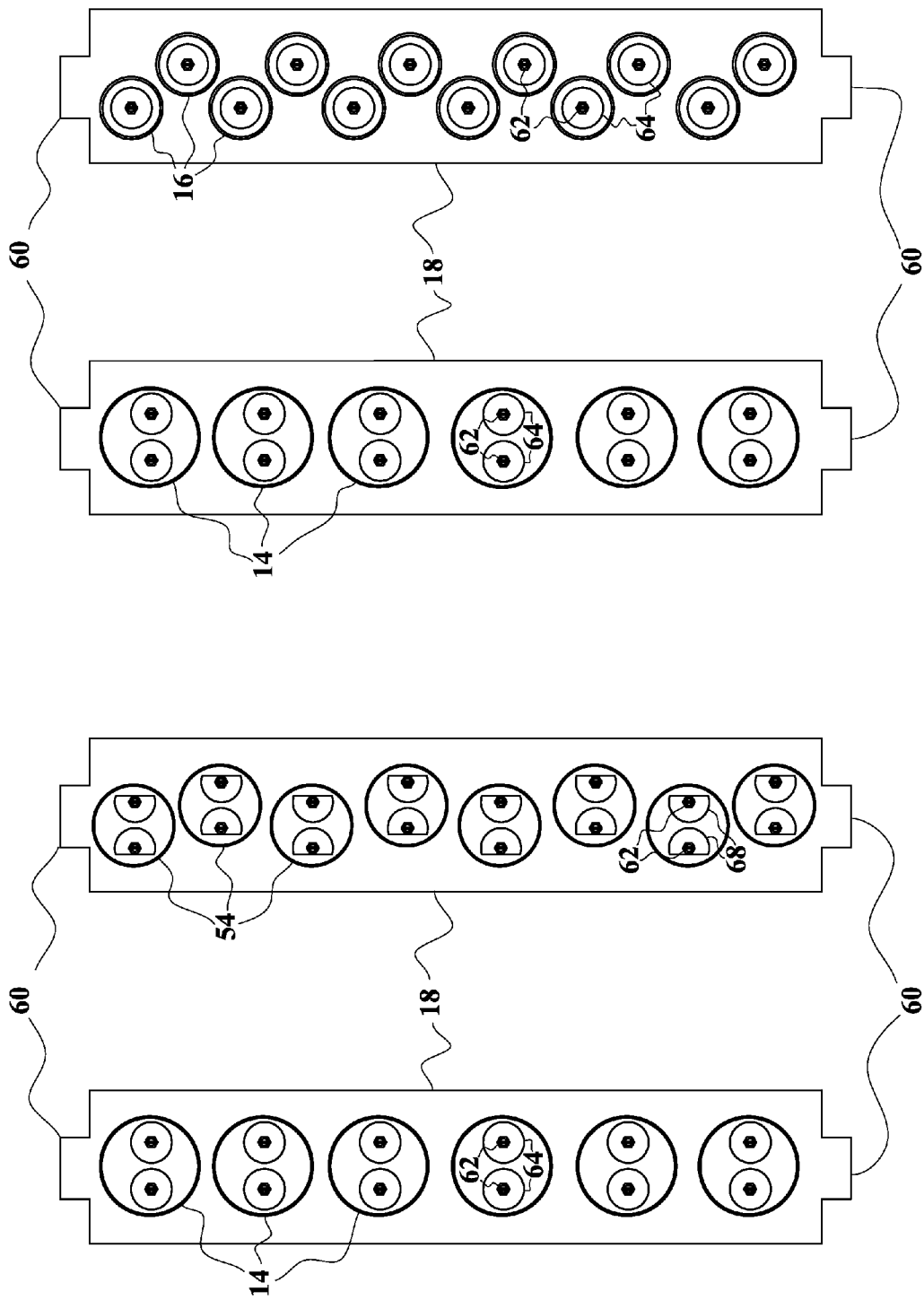
FIG. 12 is a detail view of the four slats in the first preferred embodiment of the invention, showing the lids attached to the slats.

FIG. 12 is a detail view of the four slats in the first preferred embodiment of the invention, showing the lids attached to the slats 18. Tabs 60 at the ends of the slats fits into the rectangular holes 50 in the end pieces, enabling the slats to be retained between the end pieces. Large jar lids 14 and small jar lids 16 are retained against the slats by bolts 62 with the aid of large circular washers 64. Medium jar lids 54 are retained against the slats by bolts 62 with the aid of large semicircular washers 66. (The heads of the bolts are shown in FIG. 12.)

Figure 13:
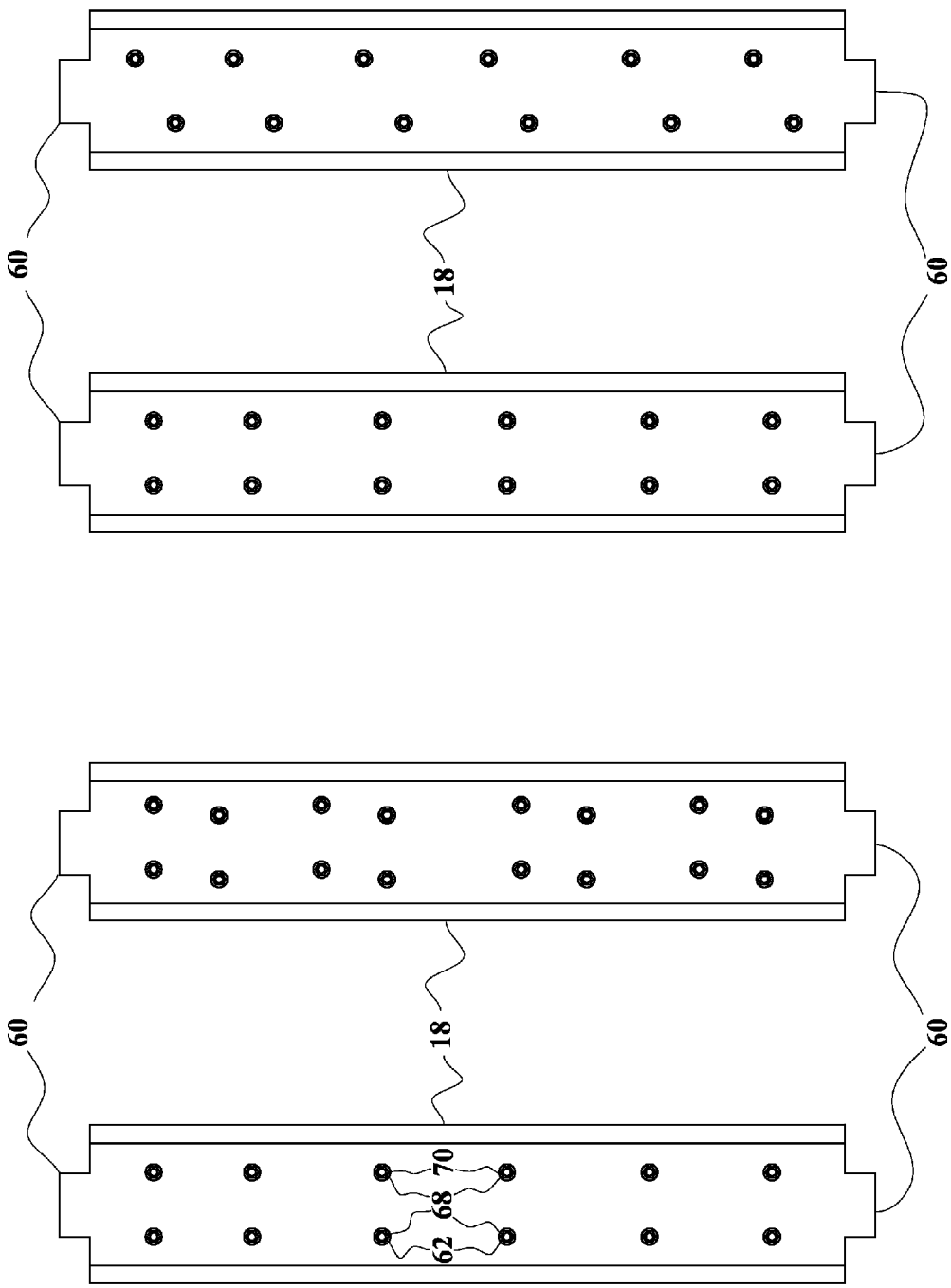
FIG. 13 is a detail view of the four slats in the first preferred embodiment of the invention, showing the sides of the slats opposite the sides to which the lids are attached.

FIG. 13 is a detail view of the four slats in the first preferred embodiment of the invention, showing the sides of the slats opposite the sides to which the lids are attached, showing the ends of the bolts 62 opposite their heads retained on the slats with the aid of nuts 68 and small washers 70.

Figure 14:
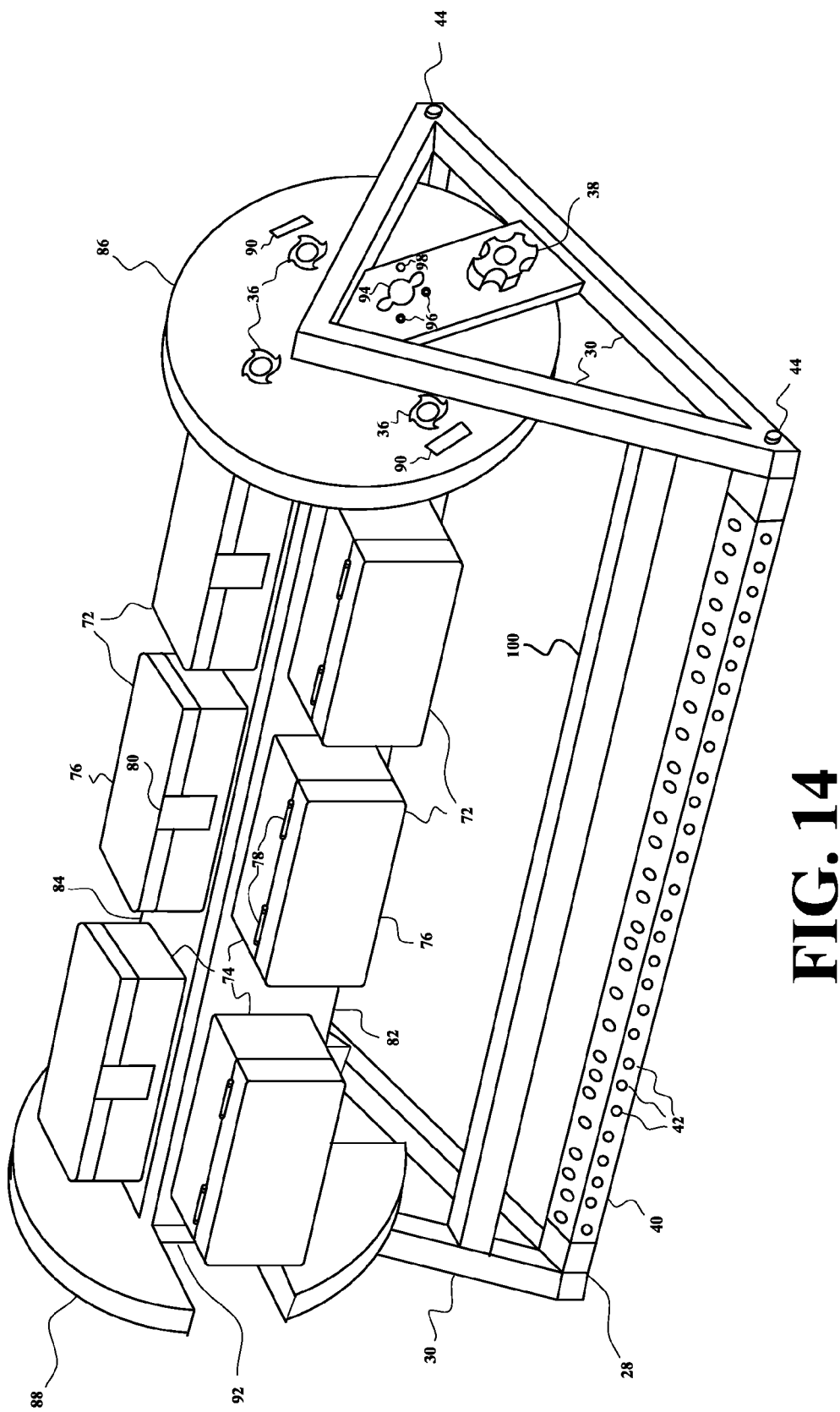
FIG. 14 is a perspective view of the second preferred embodiment of the invention, showing the organizer resting in the mounting bracket.

FIG. 14 is a perspective view of the second preferred embodiment of the invention, showing the organizer resting in the mounting bracket. Containers 72 (preferably made of plastic) are retained on the generally rectangular slats by bolts, screws, nails or other suitable means. The containers have main bodies 74, lids 76, hinges 78, and latches 80 by which the lids may be snapped open or shut. There are four slats, three of which are removable slats 82, and one of which is a rotatable slat 84 that is not removable. (The numbers of the removable and rotatable slats may be varied.) The slats are retained between right end piece 86 and left end piece 88. The end pieces are generally circular. The removable slats, when they are in the organizer, are retained on retention members having tabs on their ends that extend into rectangular holes 90 in the end pieces, by which the retention members are retained between the end pieces. The left end piece 88 has three rectangular openings 92 around its rim, through which the removable slats may be slid off of the retention members and removed from the organizer. The rotatable slat 84 is shown in a closed (lowered) position, but can be rotated to an open (raised) position that permits manual access to the axle, so the organizer can be lifted out of the mounting bracket 28 when wing nuts 94 (also called "butterfly nuts") are removed from the ends of the axle. The mounting bracket is generally similar to that in the first preferred embodiment, but the axle is removably retained in two pivot sockets with open tops, that are retained on the vertical center support 32 by two bolts 96 that pass through two of three bolt holes. (Bolt hole 98 is empty.) The position of the pivot socket can be adjusted by selecting the bolt holes to use, depending on whether the mounting bracket is attached to a horizontal or vertical surface, so that the open top of the pivot socket is always on top. Reinforcing bars 100 keep the mounting bracket stable when the organizer is removed.

Figure 15:
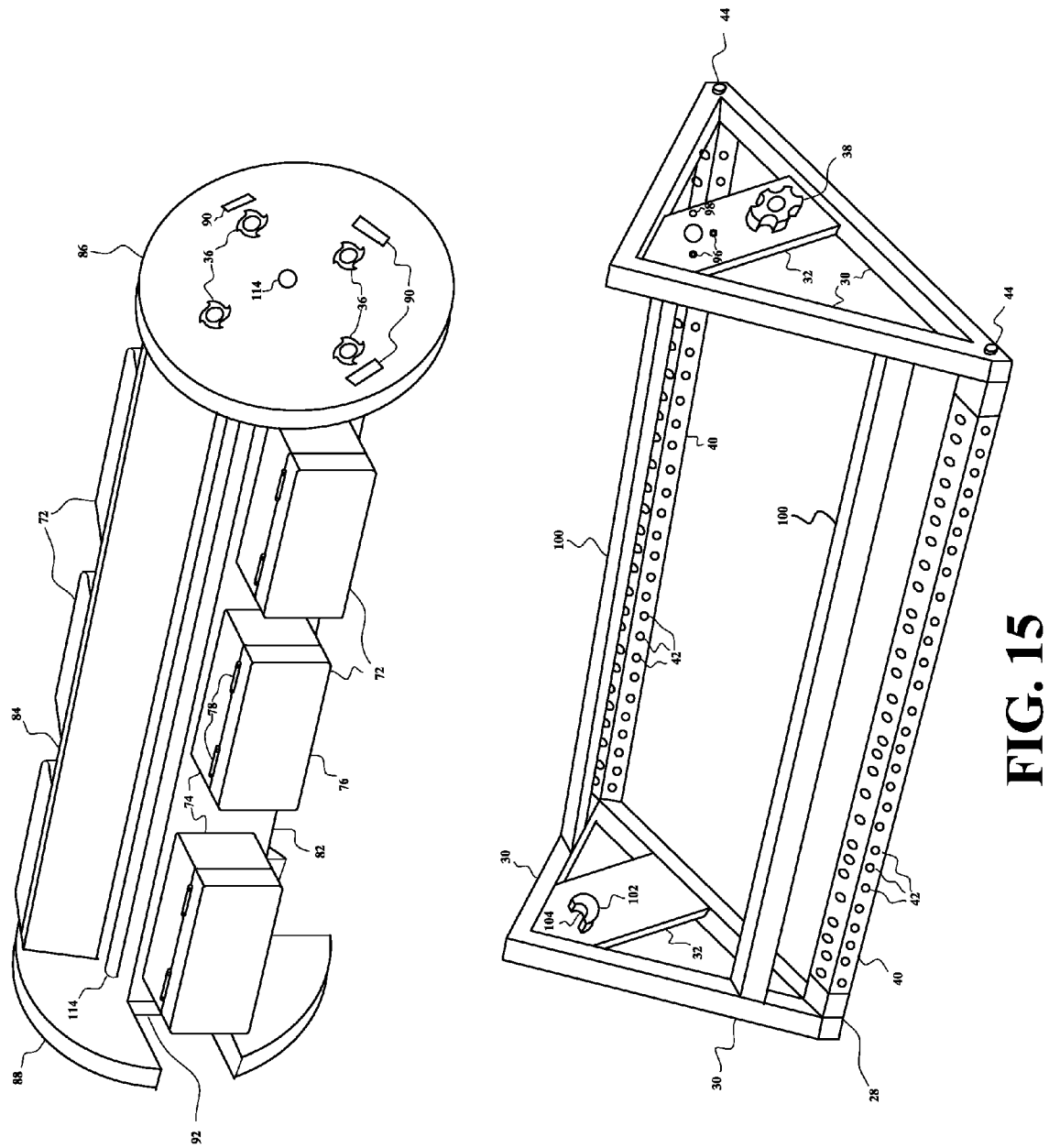
FIG. 15 is a perspective view of the second preferred embodiment of the invention, showing the organizer lifted out of the mounting bracket.
Figure 16:
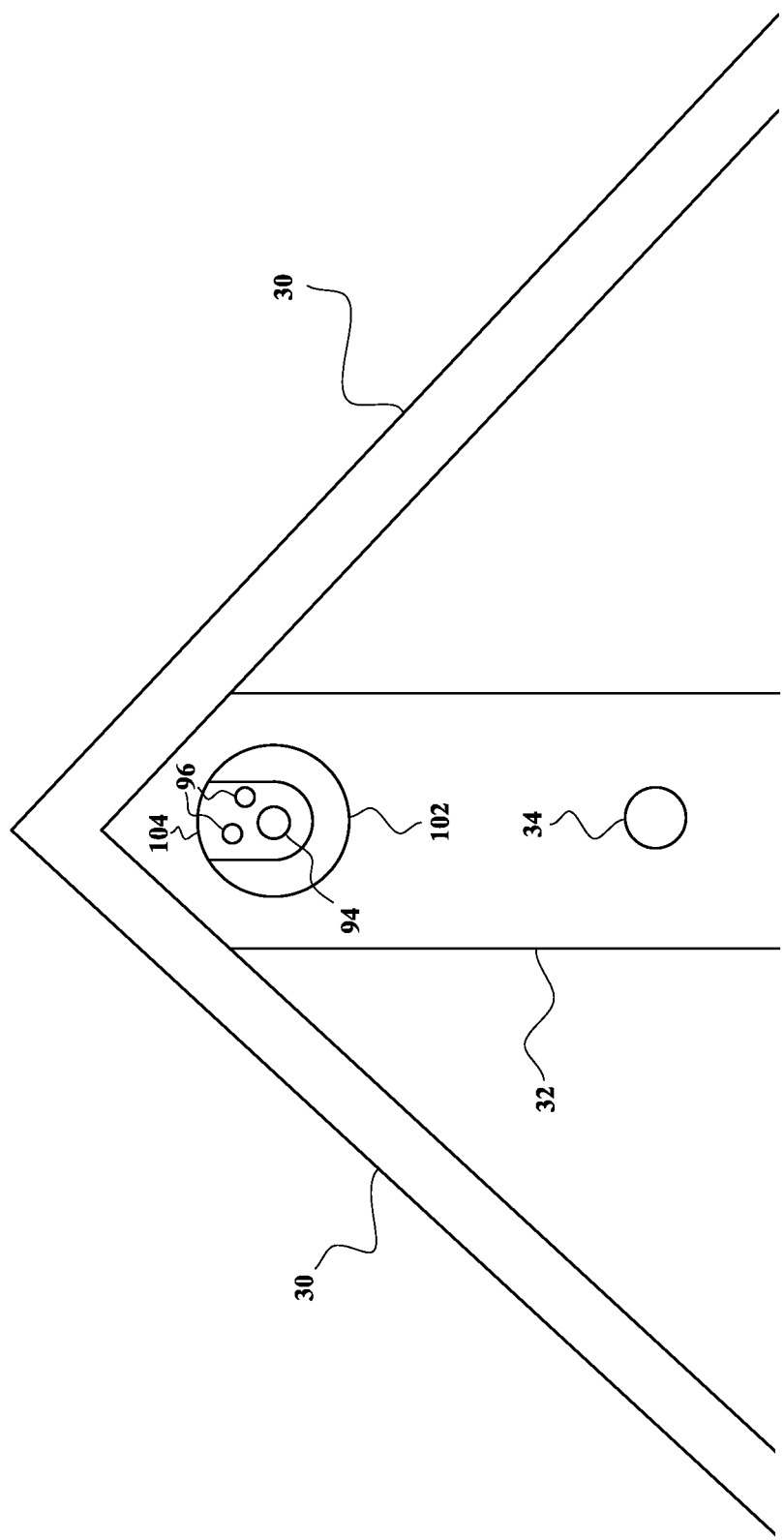
FIG. 16 is a detail view of the pivot socket in the second preferred embodiment of the invention.

FIG. 15 is a perspective view of the second preferred embodiment of the invention, showing the organizer lifted out of the mounting bracket. One of the pivot sockets 102 with an open top 104 can be seen. The rotatable slat 84 is shown in an open position. FIG. 16 is a detail view of the pivot socket in the second preferred embodiment of the invention, shown as seen from the inside of the organizer, without the axle.

Figure 17:
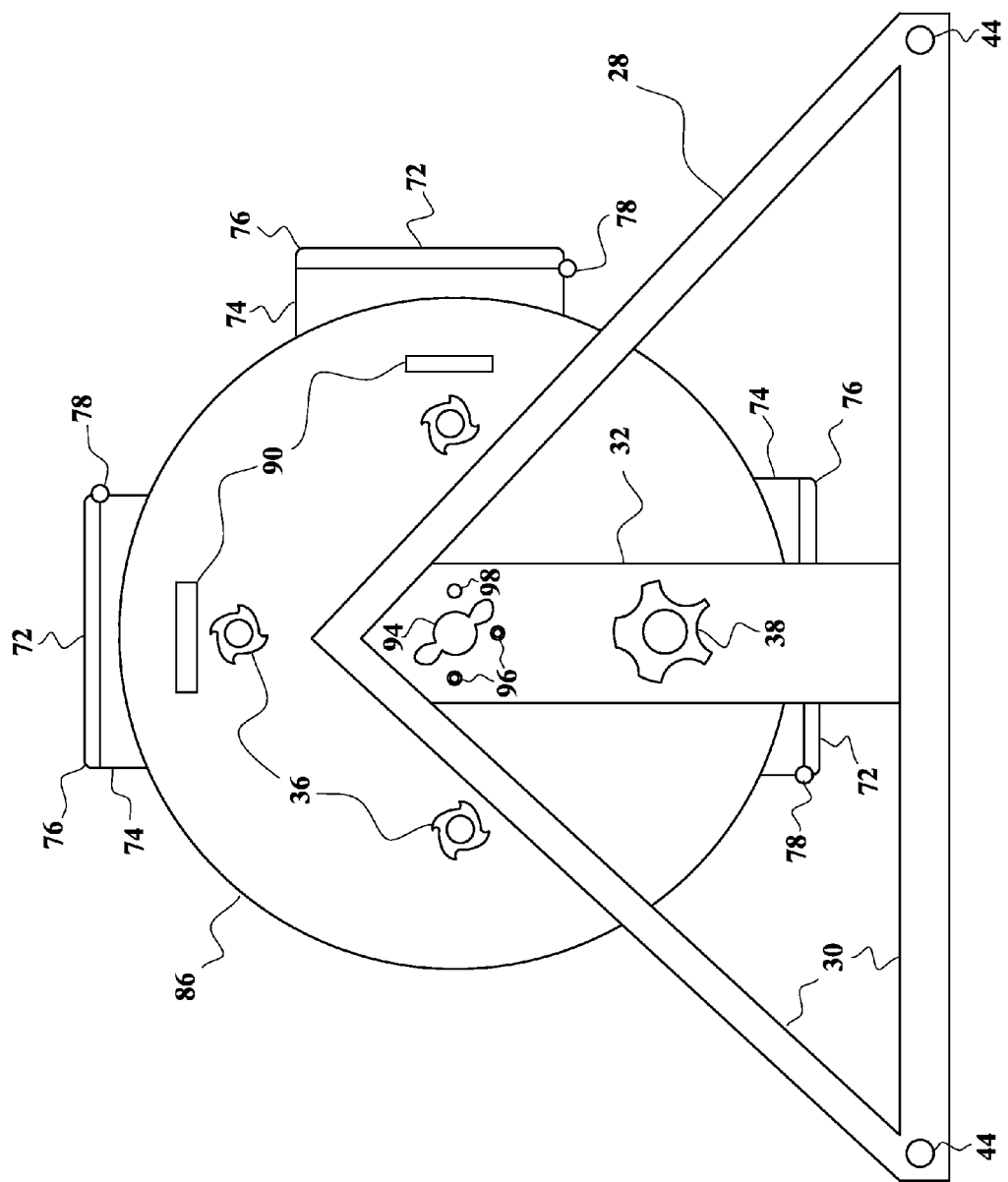
FIG. 17 is a right side elevational view of the second preferred embodiment of the invention.
Figure 18:
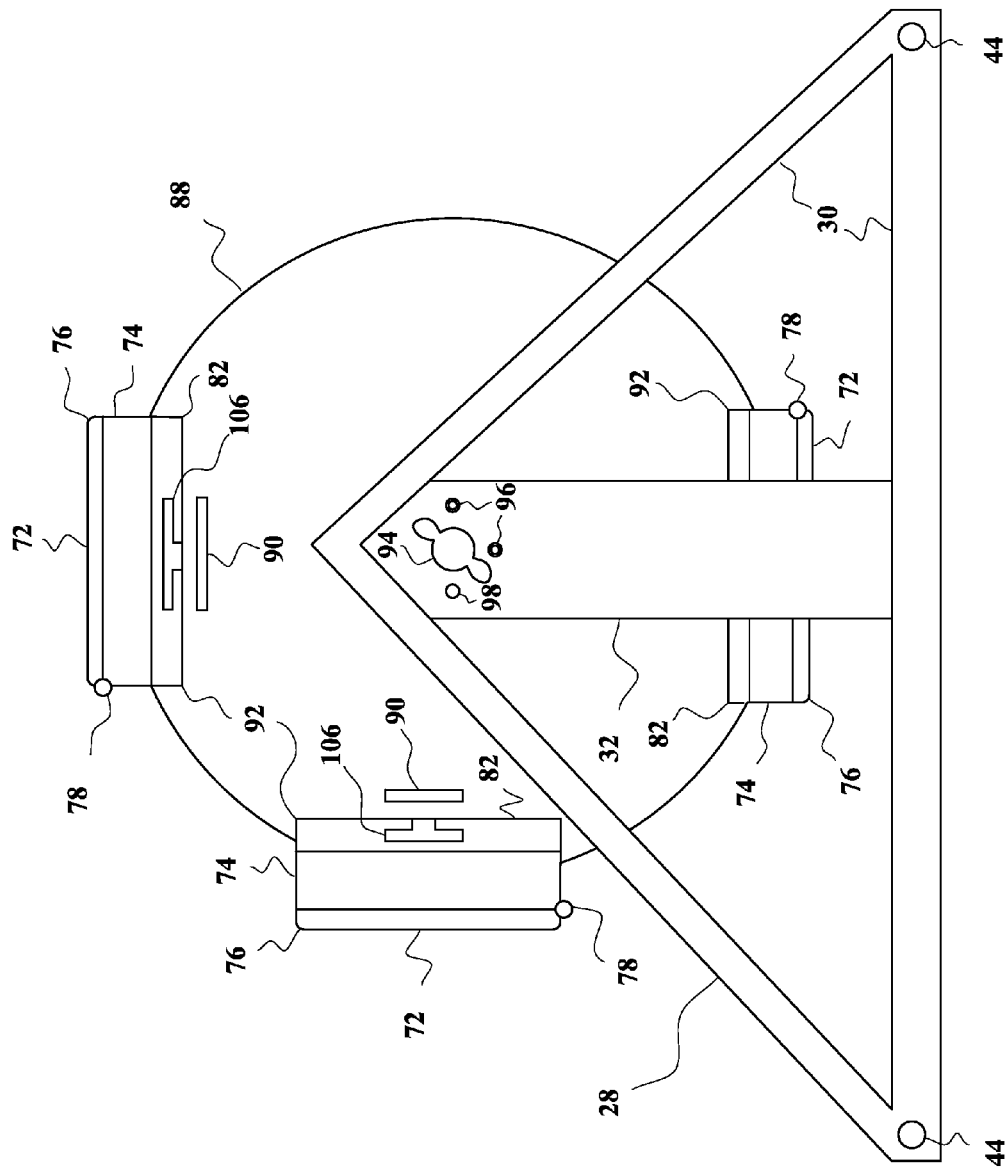
FIG. 18 is a left side view of the second preferred embodiment of the invention.

FIG. 17 is a right side elevational view of the second preferred embodiment of the invention, with the rotatable slat on the front side (but not visible in this view). FIG. 18 is a left side view of the second preferred embodiment of the invention, with the rotatable slat again on the front side, but not visible. The T-shaped longitudinal extensions 106 of the retention members can be seen inside matching longitudinal cavities of the removable slats 82, by which the latter are retained. (Optionally, either or both end pieces may have handles around their rims as in the first preferred embodiment, and/or there may be locking pins and locking sockets at both ends of the organizer.)

Figure 19:
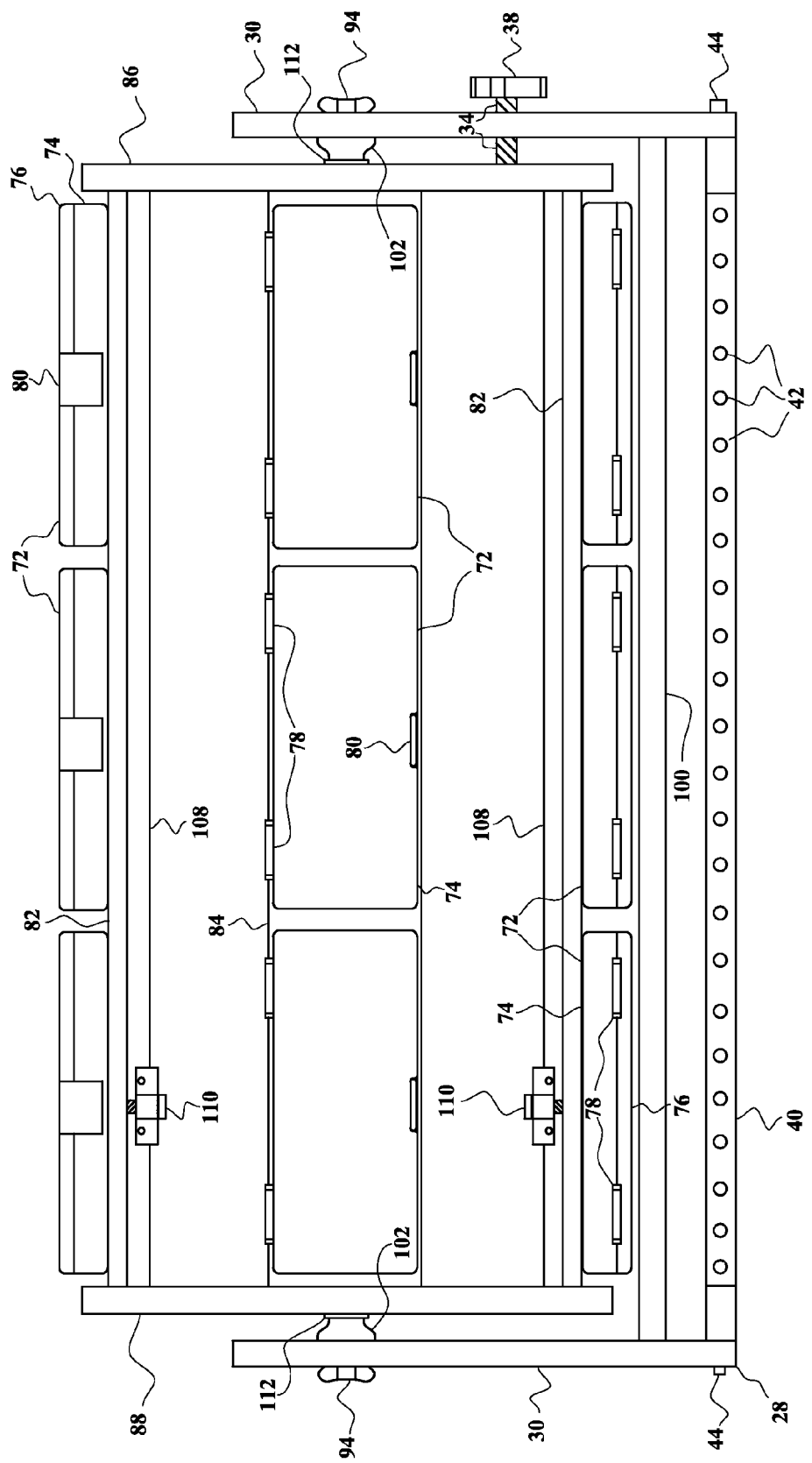
FIG. 19 is a front elevational view of the second preferred embodiment of the invention, with the containers closed.

FIG. 19 is a front elevational view of the second preferred embodiment of the invention, with the containers closed, and the rotatable slat 84 in front in a closed position. The retention members 108 that hold the removable slats 82 are shown. A first set of locking pins 110 keep the removable members from sliding off the retention members when they are in an extended position, as shown in this view. There is one locking pin attached to each retention member, and they screw into holes in the removable slats to lock them into place. Locking member 34 is turned into a locking socket in right end piece 86 to prevent rotation. Washers 112 (preferably made of plastic) reduce friction between the pivot sockets and the end pieces when the latter rotate. When all of the removable slats are locked to the retention members, and all of the rotatable slats are locked in a closed position: each slat is an equal distance from the axle; each slat is an equal distance from neighboring slats; and the slats are radially symmetric with respect to the axle. The attachment member 40 is shown in the same position as in FIG. 4.

Figure 20:
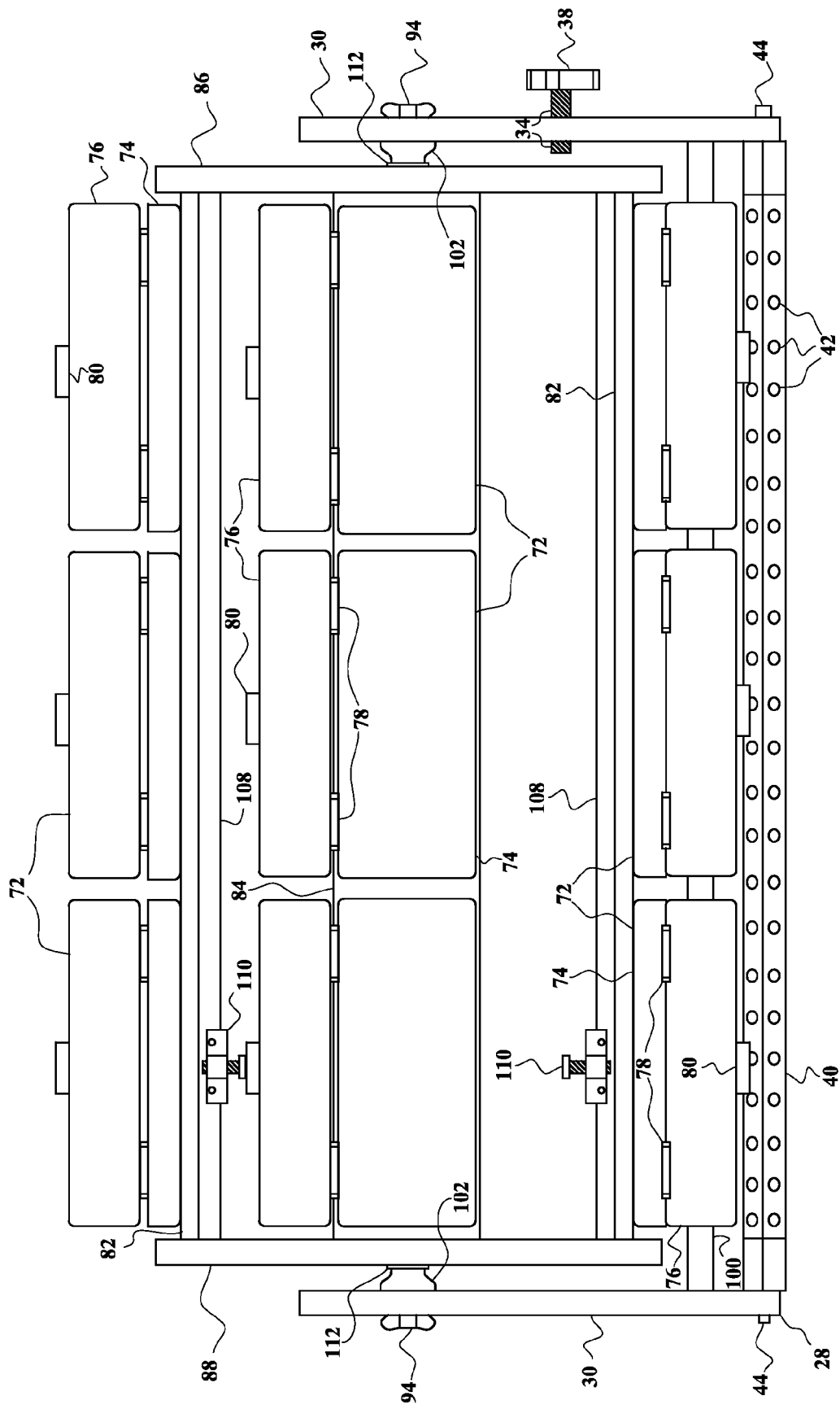
FIG. 20 is a front elevational view of the second preferred embodiment of the invention, with the containers open.

FIG. 20 is a front elevational view of the second preferred embodiment of the invention, with the containers open. The first set of locking pins 110 is in a retracted position, releasing the removable slats 82 and allowing them to be slid off the retention members and removed from the organizer. Locking member 34 is turned out in a retracted position to allow rotation. The attachment member 40 is shown in the same position as in FIG. 5.

Figure 21:
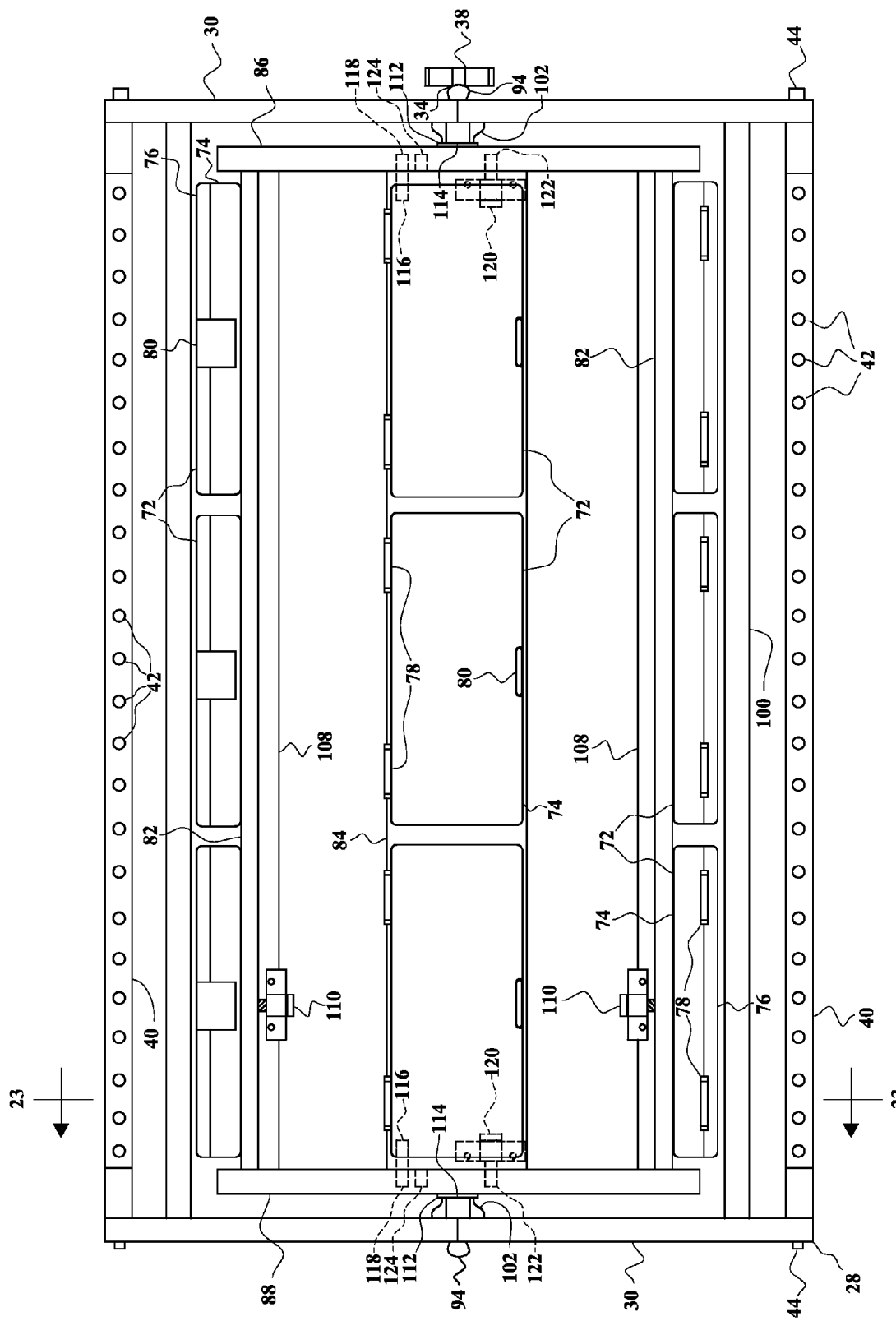
FIG. 21 is a top view of the second preferred embodiment of the invention, with the rotatable slat on top in a lowered position.

FIG. 21 is a top view of the second preferred embodiment of the invention, with the rotatable slat 84 on top in a closed position. The ends of the axle 114 are visible. The rotatable slat is attached to the end pieces by a pair of aligned fixed pins 116 that extend from opposite ends of the rotatable slat into a first set of holes 118 in the end pieces, enabling the slat to rotate between a closed position and an open position in which there is at least one opening between the slats that is wide enough for the axle to be grasped to lift the organizer. The rotatable slat can be locked in either the open position or the closed position by a second set of locking pins 120. It is locked into the closed position when the second set of locking pins are extended into the second set of holes 122 (as shown in FIG. 21). It is locked into the open position when the second set of locking pins are extended into the third set of holes 124 (as shown in FIG. 22).

Figure 22:
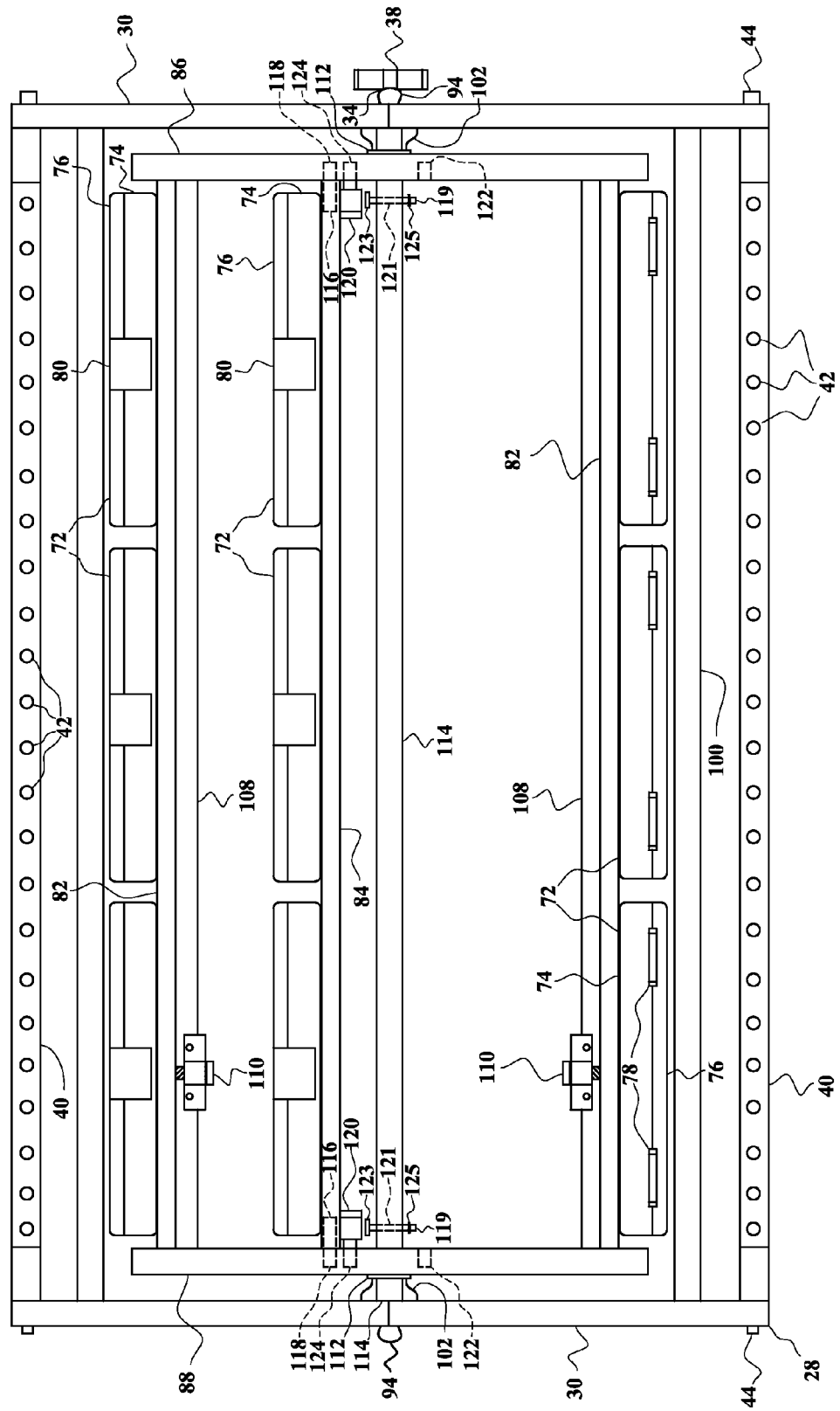
FIG. 22 is a top view of the second preferred embodiment of the invention, with the rotatable slat on top in a raised position.

FIG. 22 is a top view of the second preferred embodiment of the invention, with the rotatable slat on top in an open position, showing the axle 114. The axle passes through holes in the end pieces, and is removably retained by the wing nuts 94 on its ends and by headed locking pins 119 that pass through holes 121 in the axle adjacent to the end pieces. The headed locking pins are removably retained on the axle by their heads 123 and by cotter pins 125 passing through holes in ends opposite their heads.

Figure 23:
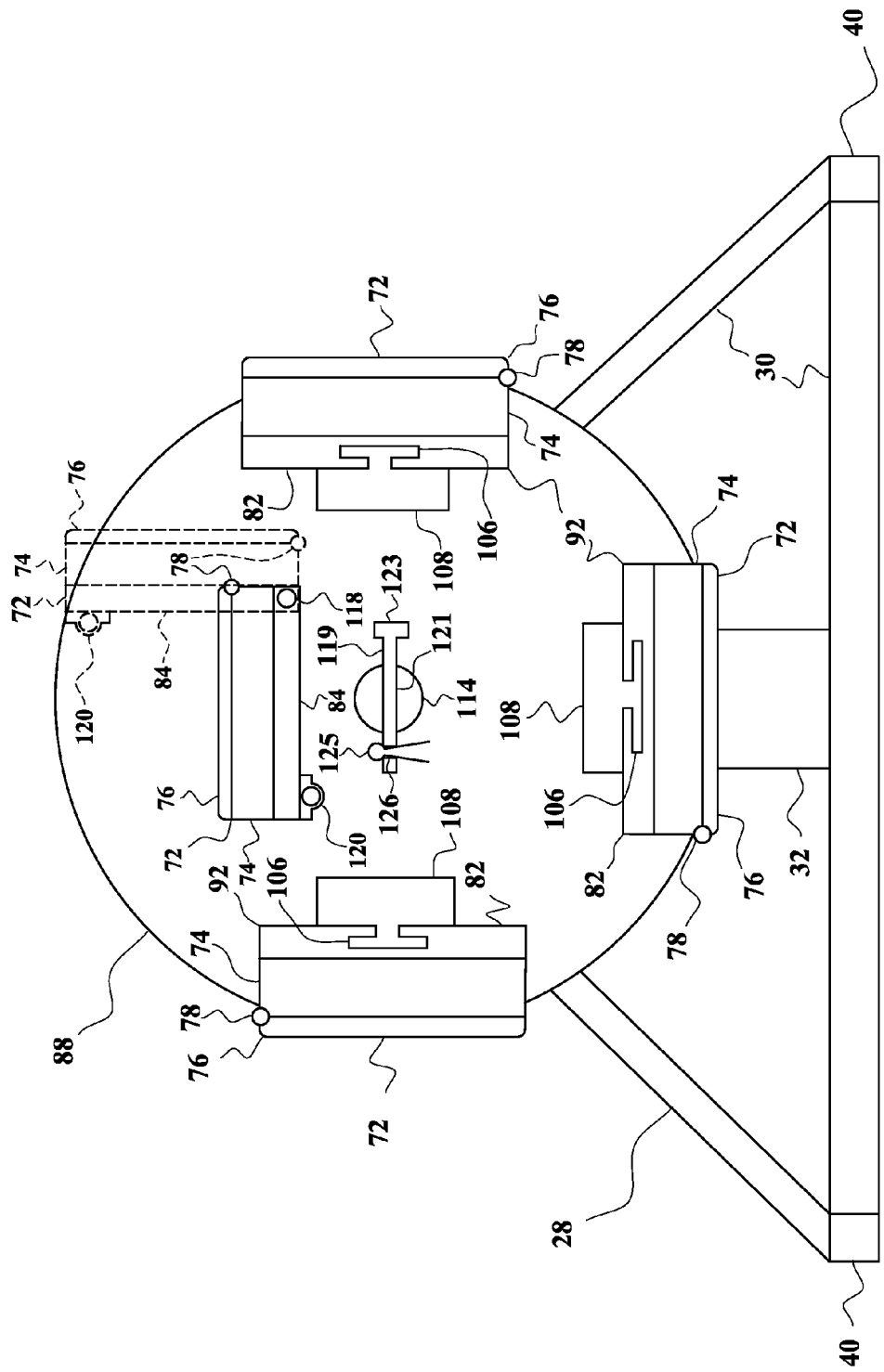
FIG. 23 is a sectional view along line 23-23 in FIG. 21.

FIG. 23 is a sectional view along line 23-23 in FIG. 21. The rotatable slat 184 is show in a closed position in solid lines, and in an open position in dashed lines. The cotter pin 125 is shown passing through a hole 126 in the headed locking pin 119.

Figure 24:
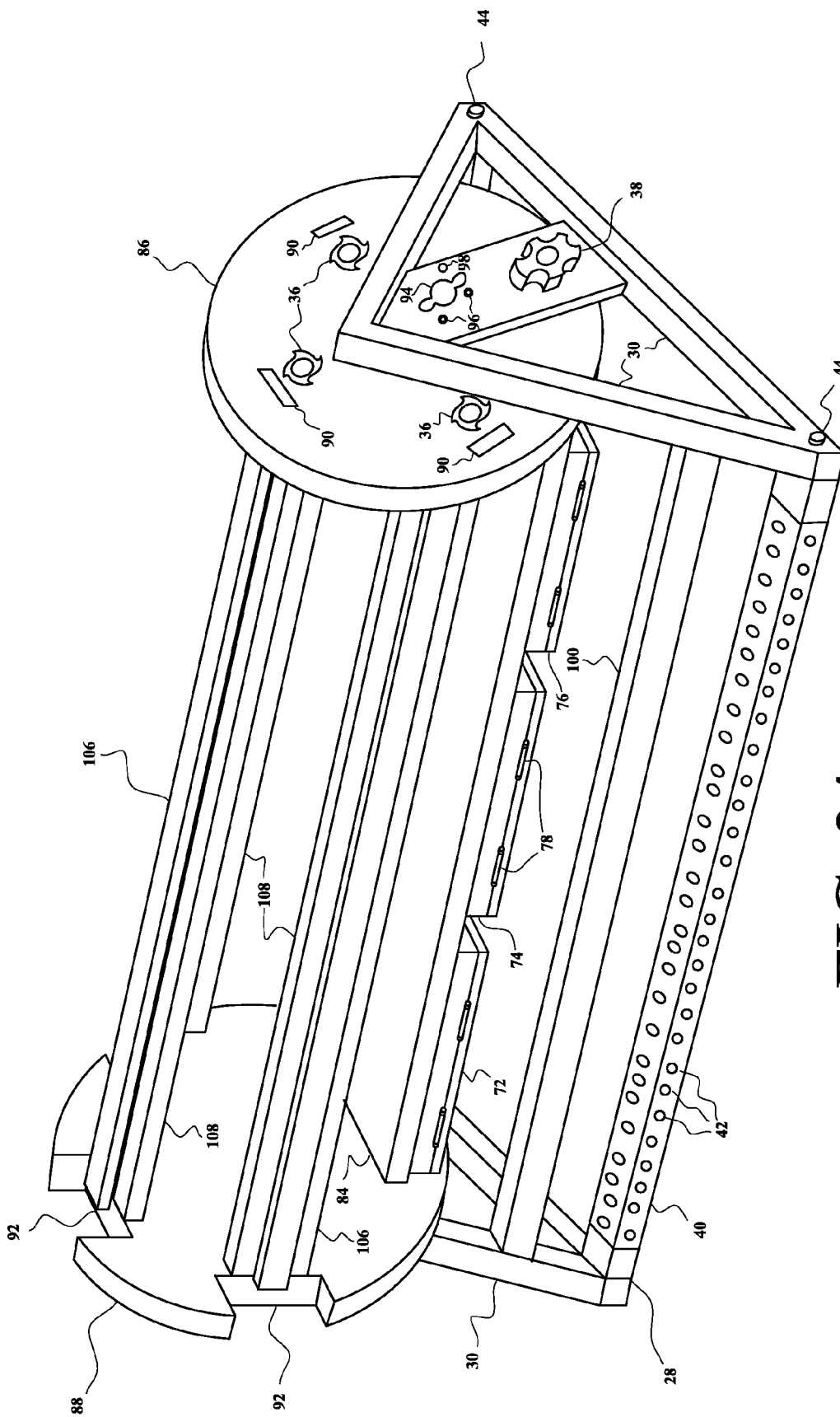
FIG. 24 is a perspective view of the second preferred embodiment of the invention, showing the organizer with the removable slats removed.

FIG. 24 is a perspective view of the second preferred embodiment of the invention, showing the organizer with the removable slats removed.

Figure 25:
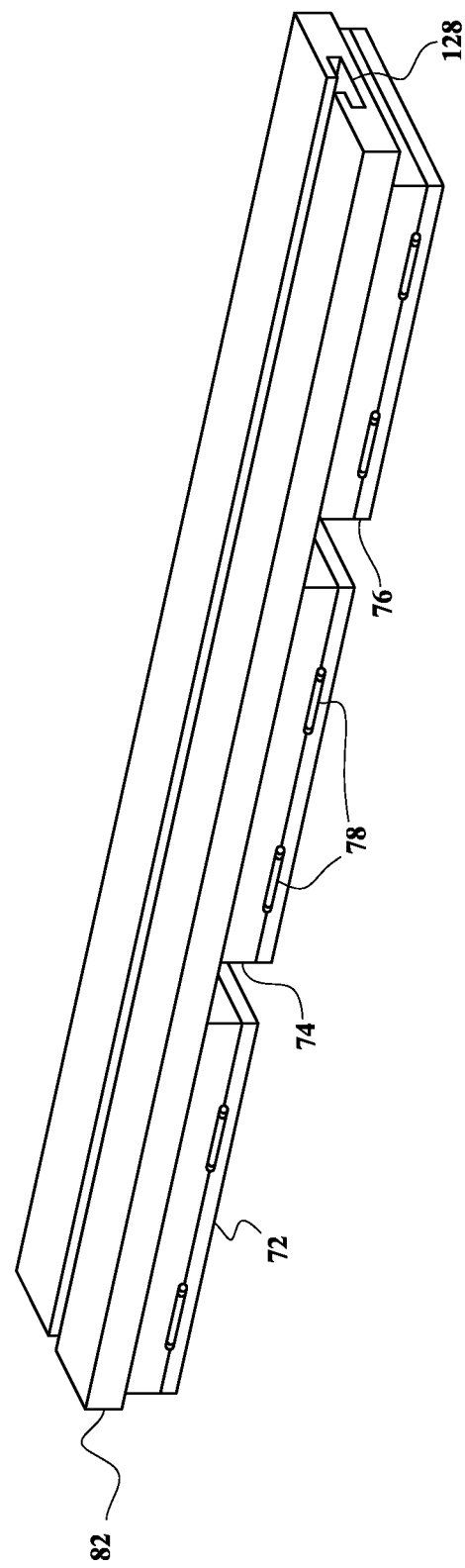
FIG. 25 is a detail view of a removable slat.

FIG. 25 is a detail view of a removable slat, showing its T-shaped cavity 128.

Figure 26:
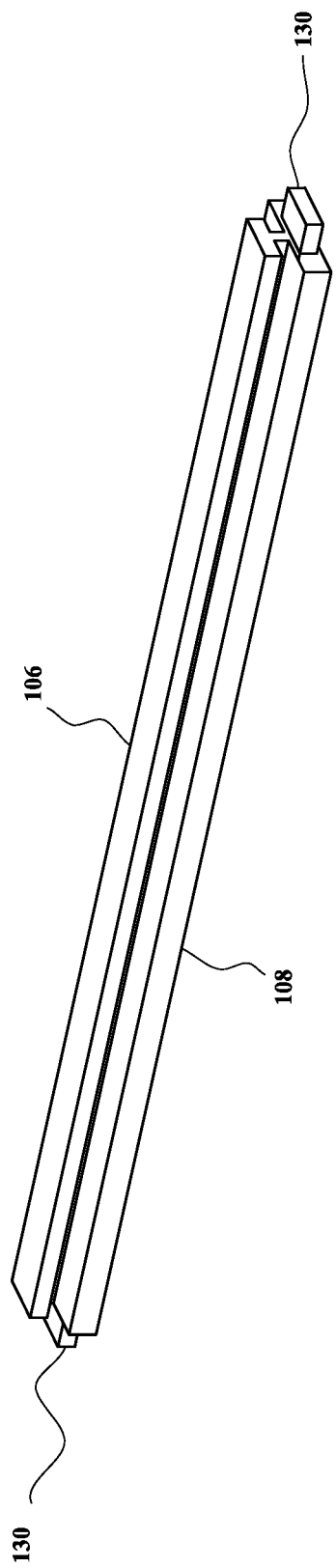
FIG. 26 is a detail view of a retention member.

FIG. 26 is a detail view of a retention member, showing the end tabs 130 that fit into the rectangular holes in the end pieces.

The preferred embodiments of the invention may be used in a method of organizing items, comprising the steps of sorting the items, and placing the items in the containers that are attached to the slats. The slats may then be rotated around the axle to select one of the containers. If the first preferred embodiment is used, there may be the further steps of unscrewing one or more of the jars from their lids, removing some of the items from the jars, and screwing the jars back onto their lids. If the second preferred embodiment is used, there may be the further steps of snapping lids of one or more of the containers open, removing some of the items from the containers, and snapping the lids of the containers shut. There may also be the further steps of removing wing nuts from ends of the axle, grasping the axle to lift the slats and containers out of the mounting bracket, grasping the axle to lower the slats and containers back into the mounting bracket, and reattaching the wing nuts to the ends of axle. In either embodiment, there may be the further step of using handles extending from a rim of at least one of the circular end pieces to rotate the organizer.

The mounting bracket may be attached to a wall, ceiling or other surface of a building, to a surface of a vehicle, to any other suitable surface, or it may be attached to any two of such surfaces.

It is to be understood that the present invention is not limited to the preferred embodiments described above, but encompasses any and all embodiments within the scope of the following claims.

I claim:

1. An organizer, comprising:
    an axle;
    a plurality of slats parallel to the axle;
    containers attached to the slats;
    two end pieces perpendicular to the axle, with the slats retained between the end pieces, wherein the slats and end pieces can rotate around the axle; and
    a mounting bracket including two pivot sockets with open tops, within which opposite ends of the axle can be removably retained;
    wherein the axle passes through holes in the end pieces, and is removably retained by wing nuts on its ends and by headed locking pins that pass through holes in the axle adjacent to the end pieces, with the headed locking pins being removably retained on the axle by their heads and by cotter pins passing through holes in ends opposite their heads.

2. The organizer according to claim 1, further comprising: lids of the containers that may be snapped open and shut.

3. The organizer according to claim 1, wherein:
    the mounting bracket has elongated attachment members, with elongated sides having apertures through which fasteners can pass, and said elongated attachment members can be rotated to allow attachment of the mounting bracket to one or more surfaces; and
    the position of the pivot sockets can be adjusted to keep their open tops upright.

4. The organizer according to claim 1, wherein:
    each slat can be individually removed from the organizer.

5. The organizer according to claim 1, wherein:
    each container can be individually removed from its slat.

6. organizer, comprising:
    an axle;
    a plurality of slats parallel to the axle;
    containers attached to the slats;
    two end pieces perpendicular to the axle, with the slats retained between the end pieces, wherein the slats and end pieces can rotate around the axle; and
    a mounting bracket including two pivot sockets with open tops, within which opposite ends of the axle can be removably retained;
    wherein one or more of the slats are removable slats having longitudinal cavities;
    retention members extend between the end pieces, and the retention members have longitudinal extensions that fit within the longitudinal cavities of the removable slats to retain the removable slats on the organizer;
    a first set of locking pins that in a extended position can lock the removable slats onto the retention members; and
    the first set of locking pins can be moved. to a retracted position to release the removable slats, allowing them to be slid off the retention members and removed from the organizer.

7. The organizer according to claim 6, wherein:
    one or more of the slats are rotatable slats attached to the end pieces by a pair of aligned fixed pins that extend from opposite ends of the rotatable slat into a set of holes in the end pieces, enabling the slat to rotate between a closed position and an open position in which there is at least one opening between the slats that is wide enough for the axle to be grasped to lift the organizer; and
    the rotatable slats can be locked in either the open position or the closed position by a second set of locking pins.

8. The organizer according to claim 7, wherein, when all of the removable slats are locked to the retention members, and all of the rotatable slats are locked in a closed position:
    each slat is an equal distance from the axle;
    each slat is an equal distance from neighboring slats; and
    the slats are radially symmetric with respect to the axle.

9. The organizer according to claim 6, further comprising: lids of the containers that may be snapped open and shut.

10. The organizer according to claim 6, wherein:
    the mounting bracket has elongated attachment members, with elongated sides having apertures through which fasteners can pass, and said elongated attachment members can be rotated to allow attachment of the mounting bracket to one or more surfaces; and
    the position of the pivot sockets can be adjusted to keep their open tops upright.

11. The organizer according to claim 6, wherein:
    each slat can be individually removed from the organizer.

12. The organizer according to claim 6, wherein:
    each container can be individually removed from its slat.

* * * * *